(12) United States Patent
Felstaine et al.

(10) Patent No.: US 9,838,265 B2
(45) Date of Patent: Dec. 5, 2017

(54) SYSTEM, METHOD, AND COMPUTER PROGRAM FOR INTER-MODULE COMMUNICATION IN A NETWORK BASED ON NETWORK FUNCTION VIRTUALIZATION (NFV)

(71) Applicant: Amdocs Software Systems Limited, Raanana (IL)

(72) Inventors: Eyal Felstaine, Hertzeliya (IL); Ofer Hermoni, Yavne (IL); Nimrod Sandlerman, Ramat Gan (IL); Itzik Kitroser, Beer Sheva (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 121 days.

(21) Appl. No.: 14/572,729

(22) Filed: Dec. 16, 2014

(65) Prior Publication Data

US 2015/0180730 A1 Jun. 25, 2015

Related U.S. Application Data

(60) Provisional application No. 61/918,597, filed on Dec. 19, 2013, provisional application No. 61/941,380, (Continued)

(51) Int. Cl.
*G06F 15/173* (2006.01)
*H04L 12/24* (2006.01)
(Continued)

(52) U.S. Cl.
CPC ............ *H04L 41/20* (2013.01); *H04L 41/022* (2013.01); *H04L 41/28* (2013.01); *H04W 12/08* (2013.01); *H04W 28/00* (2013.01)

(58) Field of Classification Search
CPC ..... H04L 45/50; H04L 12/4641; H04L 45/02; H04L 45/12; H04L 45/22; H04L 45/306;
(Continued)

(56) References Cited

U.S. PATENT DOCUMENTS

| 5,629,081 A | 5/1997 | Richards et al. |
| 6,345,239 B1 | 2/2002 | Bowman-Amuah |

(Continued)

FOREIGN PATENT DOCUMENTS

| JP | EP 2849064 A1 * | 3/2015 | ........... G06F 9/5072 |
| WO | 01/07170 A1 | 2/2001 | |

(Continued)

OTHER PUBLICATIONS

International Search Report and Written Opinion from PCT Application No. PCT/EP2014/078768, dated Apr. 1, 2015.
(Continued)

*Primary Examiner* — Arvin Eskandarnia
*Assistant Examiner* — Thao Duong
(74) *Attorney, Agent, or Firm* — Zilka-Kotab, PC

(57) ABSTRACT

According to one aspect of the present invention there is provided a system, method, and computer program product for communicating information in a communication network using network function virtualization (NFV-based communication network), the method including: sending a communication from a first entity of the NFV-based communication network, the first entity being a sender, and receiving the communication by a second entity of the NFV-based communication network, the second entity being a receiver, where the communication includes: an identification of the sender of the communication, and an identification of the receiver of the communication, an identification of a function associated with the NFV-based
(Continued)

communication network, and an authorization associating one or more of the sender and the receiver with the function.

6 Claims, 24 Drawing Sheets

Related U.S. Application Data filed on Feb. 18, 2014, provisional application No. 61/981,116, filed on Apr. 17, 2014, provisional application No. 62/026,508, filed on Jul. 18, 2014, provisional application No. 62/026,512, filed on Jul. 18, 2014, provisional application No. 62/027,709, filed on Jul. 22, 2014.

(51) Int. Cl.
 *H04W 12/08* (2009.01)
 *H04W 28/00* (2009.01)

(58) Field of Classification Search
 CPC ......... H04L 12/24; H04L 12/26; H04L 12/54; H04L 1/24; H04N 5/23212
 See application file for complete search history.

(56) References Cited

U.S. PATENT DOCUMENTS

| | | | |
|---|---|---|---|
| 6,427,132 B1 | 7/2002 | Bowman-Amuah | |
| 6,611,867 B1 | 8/2003 | Bowman-Amuah | |
| 6,983,037 B2 | 1/2006 | Argo | |
| 7,069,234 B1 | 6/2006 | Cornelius et al. | |
| 7,167,844 B1 | 1/2007 | Leong et al. | |
| 7,610,233 B1 | 10/2009 | Leong et al. | |
| 7,711,978 B1* | 5/2010 | Roy | G06F 11/201 714/43 |
| 7,860,232 B2 | 12/2010 | Huang | |
| 8,023,425 B2 | 9/2011 | Raleigh | |
| 8,023,494 B2 | 9/2011 | Takeda | |
| 8,166,176 B2 | 4/2012 | Kumar et al. | |
| 8,229,812 B2 | 7/2012 | Raleigh | |
| 8,250,207 B2 | 8/2012 | Raleigh | |
| 8,270,310 B2 | 9/2012 | Raleigh | |
| 8,270,952 B2 | 9/2012 | Raleigh | |
| 8,321,526 B2 | 11/2012 | Raleigh | |
| 8,326,958 B1 | 12/2012 | Raleigh | |
| 8,331,901 B2 | 12/2012 | Raleigh | |
| 2001/0037416 A1* | 11/2001 | Udink | H04L 12/24 719/331 |
| 2008/0095138 A1 | 4/2008 | Wu et al. | |
| 2009/0181653 A1* | 7/2009 | Alharayeri | H04W 4/02 455/414.1 |
| 2010/0085914 A1 | 4/2010 | Kunniyur et al. | |
| 2010/0188975 A1 | 7/2010 | Raleigh | |
| 2010/0188990 A1 | 7/2010 | Raleigh | |
| 2010/0188991 A1 | 7/2010 | Raleigh | |
| 2010/0188992 A1 | 7/2010 | Raleigh | |
| 2010/0188993 A1 | 7/2010 | Raleigh | |
| 2010/0188994 A1 | 7/2010 | Raleigh | |
| 2010/0188995 A1 | 7/2010 | Raleigh | |
| 2010/0190470 A1 | 7/2010 | Raleigh | |
| 2010/0191575 A1 | 7/2010 | Raleigh | |
| 2010/0191576 A1 | 7/2010 | Raleigh | |
| 2010/0191604 A1 | 7/2010 | Raleigh | |
| 2010/0191612 A1 | 7/2010 | Raleigh | |
| 2010/0191613 A1 | 7/2010 | Raleigh | |
| 2010/0191846 A1 | 7/2010 | Raleigh | |
| 2010/0191847 A1 | 7/2010 | Raleigh | |
| 2010/0192120 A1 | 7/2010 | Raleigh | |
| 2010/0192170 A1 | 7/2010 | Raleigh | |
| 2010/0192207 A1 | 7/2010 | Raleigh | |
| 2010/0192212 A1 | 7/2010 | Raleigh | |
| 2011/0103374 A1 | 5/2011 | Lajoie et al. | |
| 2011/0107364 A1 | 5/2011 | Lajoie et al. | |
| 2011/0107379 A1 | 5/2011 | Lajoie et al. | |
| 2012/0088470 A1 | 4/2012 | Raleigh | |
| 2012/0089845 A1 | 4/2012 | Raleigh | |
| 2012/0134291 A1 | 5/2012 | Raleigh | |
| 2012/0195206 A1 | 8/2012 | Raleigh | |
| 2012/0195222 A1 | 8/2012 | Raleigh | |
| 2012/0195223 A1 | 8/2012 | Raleigh | |
| 2012/0196565 A1 | 8/2012 | Raleigh | |
| 2012/0197792 A1 | 8/2012 | Raleigh | |
| 2012/0201133 A1 | 8/2012 | Raleigh | |
| 2012/0203677 A1 | 8/2012 | Raleigh | |
| 2012/0208496 A1 | 8/2012 | Raleigh | |
| 2012/0209750 A1 | 8/2012 | Raleigh | |
| 2012/0210391 A1 | 8/2012 | Raleigh | |
| 2012/0214441 A1 | 8/2012 | Raleigh | |
| 2014/0033282 A1* | 1/2014 | Bournelle | H04L 63/08 726/4 |
| 2014/0317293 A1* | 10/2014 | Shatzkamer | G06F 9/455 709/226 |

FOREIGN PATENT DOCUMENTS

| | | |
|---|---|---|
| WO | 01/16849 A2 | 3/2001 |
| WO | 01/17169 A2 | 3/2001 |
| WO | 01/17313 A1 | 3/2001 |
| WO | 01/46846 A2 | 6/2001 |
| WO | 01/46889 A2 | 6/2001 |
| WO | 2010/088072 A1 | 8/2010 |
| WO | 2010/088073 A1 | 8/2010 |
| WO | 2010/088074 A1 | 8/2010 |
| WO | 2010/088075 A1 | 8/2010 |
| WO | 2010/088076 A1 | 8/2010 |
| WO | 2010/088080 A1 | 8/2010 |
| WO | 2010/088081 A1 | 8/2010 |
| WO | 2010/088082 A1 | 8/2010 |
| WO | 2010/088083 A1 | 8/2010 |
| WO | 2010/088085 A1 | 8/2010 |
| WO | 2010/088086 A1 | 8/2010 |
| WO | 2010/088087 A1 | 8/2010 |
| WO | 2010/088094 A1 | 8/2010 |
| WO | 2010/088095 A1 | 8/2010 |
| WO | 2010/088096 A1 | 8/2010 |
| WO | 2010/088097 A1 | 8/2010 |
| WO | 2010/088098 A1 | 8/2010 |
| WO | 2010/088100 A1 | 8/2010 |
| WO | 2010/088101 A1 | 8/2010 |
| WO | 2011/053858 A1 | 5/2011 |

OTHER PUBLICATIONS

"Network Function Virtualisation; Use Cases," ETSI, GS NFV 009, V0.1.6, Sep. 2013, pp. 1-56.

"SNMPv3 with Security and Administration," Mar. 31, 2012, pp. 1-4, retrieved from http://web.archive.org/web/20120331030741/ http://www.snmp.com/snmpv3/snmpv3_intro.shtml.

Stallings, "SNMPv3: A Security Enhancement for SNMP," IEEE Communications Surveys, vol. 1, No. 1, Jan. 1, 1998, pp. 2-17.

Pras, "SNMPv3," Jan. 1, 2005, retrieved from http://www.simpleweb.org/w/images/c/c1/Tutorial_Slides_Snmpv3.pdf.

Box, "Web Services Addressing (WS-Addressing)," W3C, Aug. 10, 2004, retrieved from http://www.w3.org/Submission/ws-addressing/#WSTrust.

Anderson, "Web Services Trust Language (WS-Trust)," Feb. 2005, retrieved from http://specs.xmlsoap.org/ws/2005/02/trust/WS-Trust.pdf.

"Network Functions Virtualisation; Part 1: Security; Sub-part 1: Problem Statement," ETSI, GS NFV SEC V0.0.5, Oct. 2013, pp. 1-35.

"Network Functions Virtualisation (NFV); Architectural Framework," ETSI, ETSI GS NFV 002 V1.1.1, Oct. 2013, retrieved from http://www.etsi.org/deliver/etsi_gs/NFV/001_099/002/01.01.01_60/gs_NFV002v010101p.pdf.

US 8,089,898, 01/2012, Headwater Partners I, LLC (withdrawn).

* cited by examiner

```
[(COMMAND)
  [(COMMAND-INFO)
    (SENDER-ID:###)(RECEIVER-ID:###)(MODULE-ID:###)(AUTHENTICATION:###)]
  (INSTRUCTION)
    (INSTRUCTION-ID:###)(INSTRUCTION-TYPE:###)(AUTHENTICATION:###)(TIME:###)
    (MODIFIER-ID:###)(MODIFIER-TYPE:###)(MODIFIER-VALUE:###)
    (MODIFIER-VALUE:###)(MODIFIER-TYPE:###) (MODIFIER-ID:###)]
  (PROCEDURE-INFO)
    (PROCEDURE-ID:###)(PROCEDURE-TYPE:###)(AUTHENTICATION:###)(PROCEDURE-FLOW:###)(PROCEDURE-HISTORY:###))]
```

Fig. 12

```
[PROCEDURE -FLOW-OUT:CALL-CONFERENCE-001:
 NFVO-042:[(INSTRUCTION-ID=E0001)
 VOIP-SYSTEM-73:[(INSTRUCTION-ID=E0002)(INSTRUCTION-ID=E0003)(INSTRUCTION-ID=E0004)
 MOBILE-SWITCH-04:[(INSTRUCTION-ID=E0005)...]
 SMS-SERVER-07:[(INSTRUCTION-ID=E0006)...]
 EMAIL-EXCHANGE-004:[(INSTRUCTION-ID=E0007)...]
 RECORDER-005:[(INSTRUCTION-ID=E0007)...]
 ...]
```

{INSTRUCTION}
{INSTRUCTION-ID:EC001}{INSTRUCTION-TYPE:PROCESS-INITIATION}{AUTHENTICATION:###}{TIME:###}
{MODIFIER-ID:ECF003}{MODIFIER-TYPE:ASSIGN-VNF}{MODIFIER-VALUE: MOBILE-SWITCH}
{MODIFIER-ID:ECF002}{MODIFIER-TYPE:INITIATE-VNF}{MODIFIER-VALUE:EC007}
{INSTRUCTION-ID:EC007}{INSTRUCTION-TYPE:INITIATE-VNF}{AUTHENTICATION:###}{TIME:###}
{MODIFIER-ID:ECF003}{MODIFIER-TYPE:RECORDER-TYPE:1}
{INSTRUCTION-ID:EC002}{INSTRUCTION-TYPE:CONFERENCE-CALL-EC014}
{AUTHENTICATION:###}{TIME:###}
{MODIFIER-ID:EC-LIST-014-1}{MODIFIER-TYPE:VOIP-ID}{MODIFIER-VALUE:GEORGE M,JANE F,JOHN W}]
{AUTHENTICATION:###}{TIME:###}
{MODIFIER-ID:EC-DIVERT-31}{MODIFIER-TYPE:DIVERTION}{MODIFIER-VALUE:
F(RING-NO-ANSWER,EXE:DIVERT001))
{INSTRUCTION-ID:EC004}{INSTRUCTION-TYPE: DIVERT001} {AUTHENTICATION:###}{TIME:###}
{MODIFIER-ID:EC-DIVERT-02}{MODIFIER-TYPE:DIVERTION-TARGET}{MODIFIER-VALUE:
MOBILE-SWITCH}
{INSTRUCTION-ID:EC005}{INSTRUCTION-TYPE:CONFERENCE-CALL-EC015}
{AUTHENTICATION:###}{TIME:###}
{MODIFIER-ID:EC-LIST-014-1}{MODIFIER-TYPE:MOBILE-CONFERENCE}{MODIFIER-
VALUE:GEORGE M,JANE F,JOHN W}

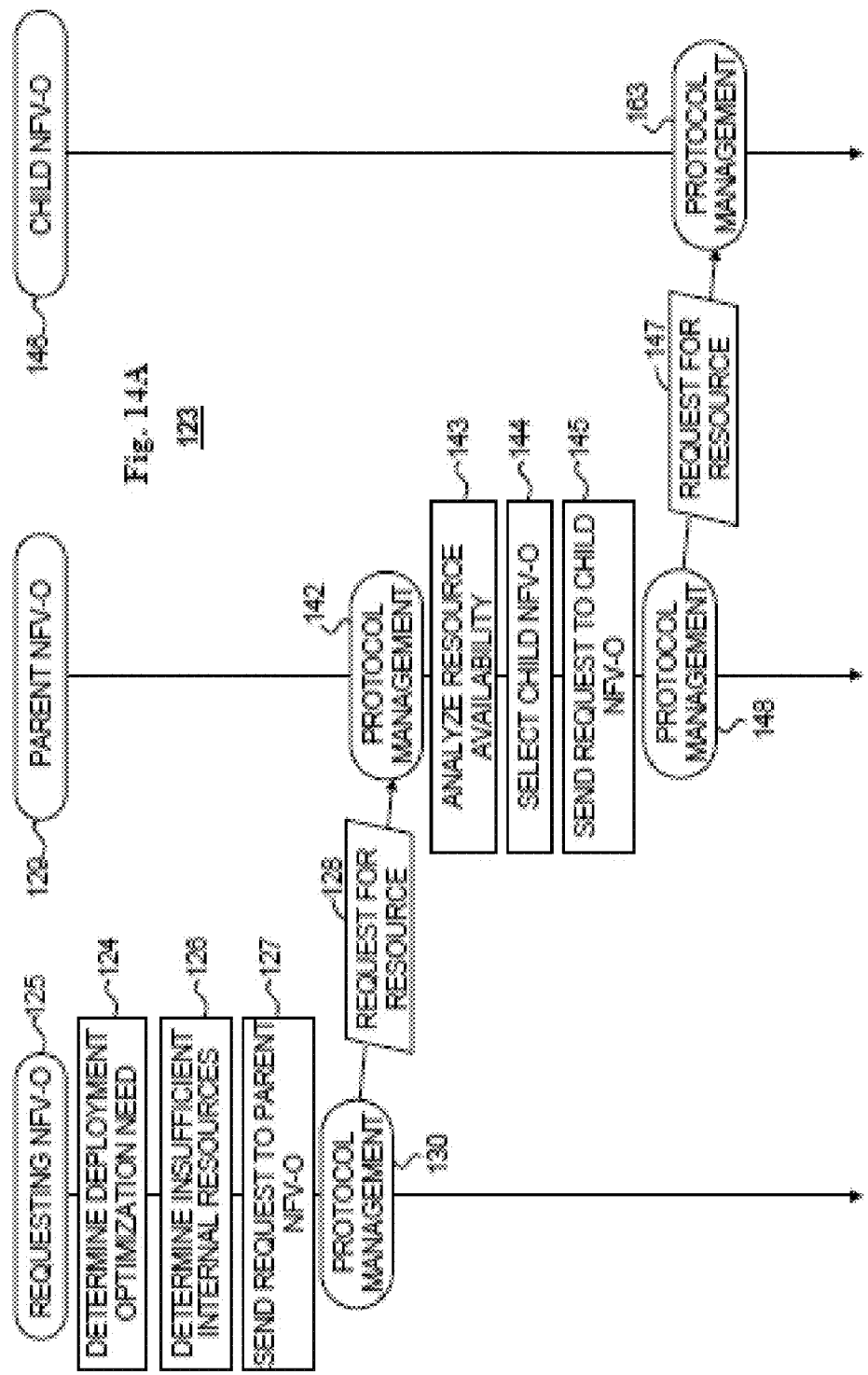

123

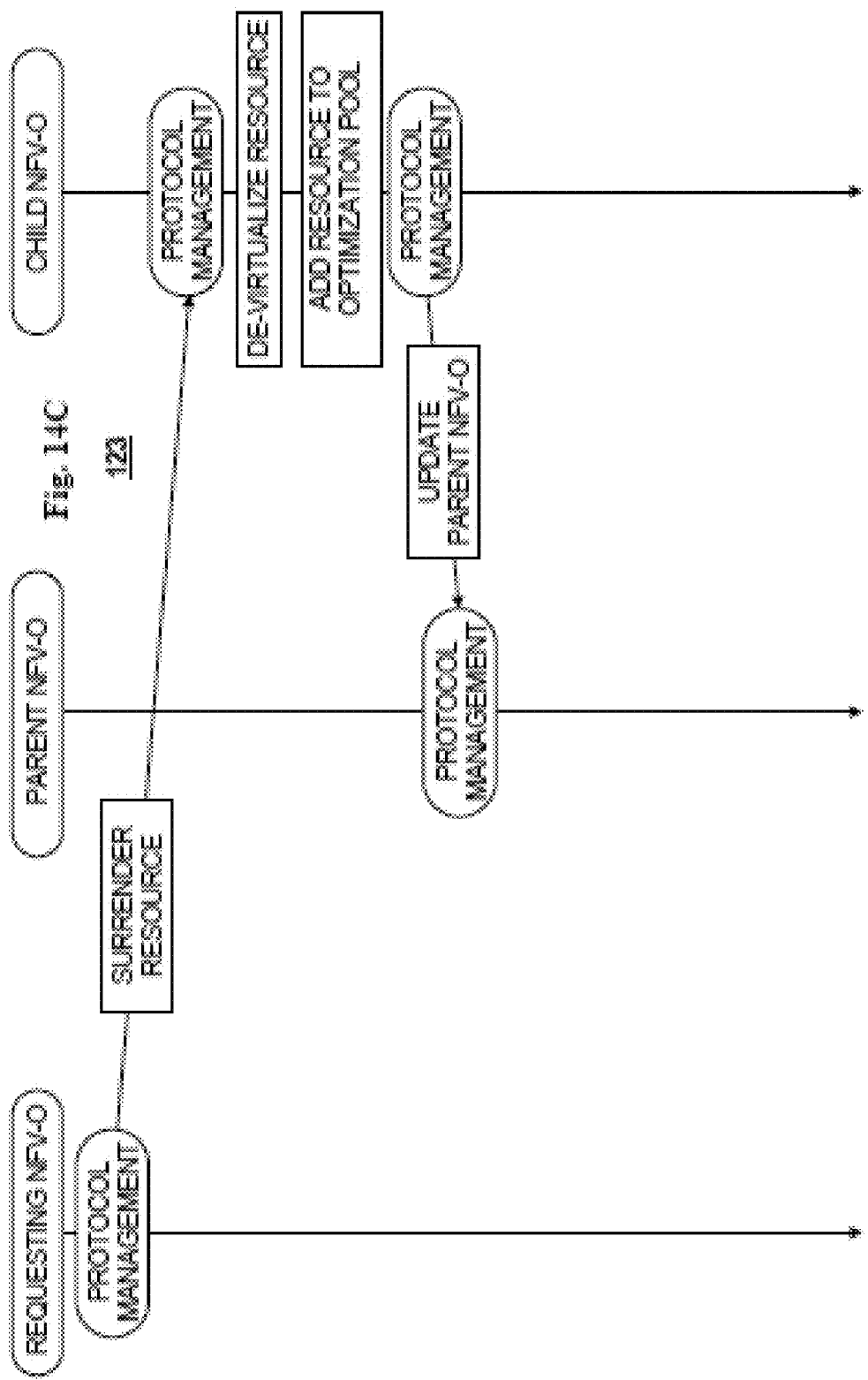

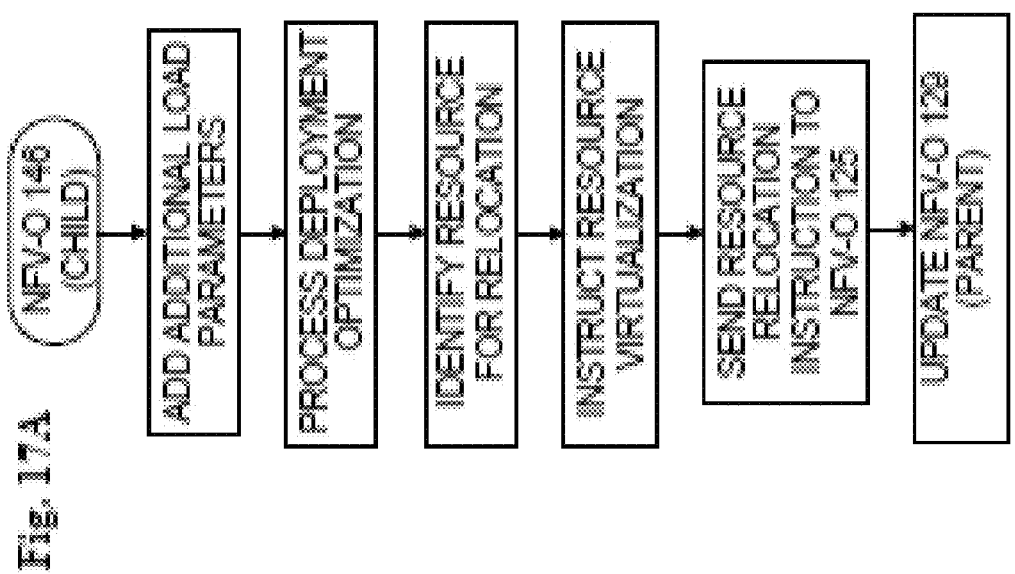

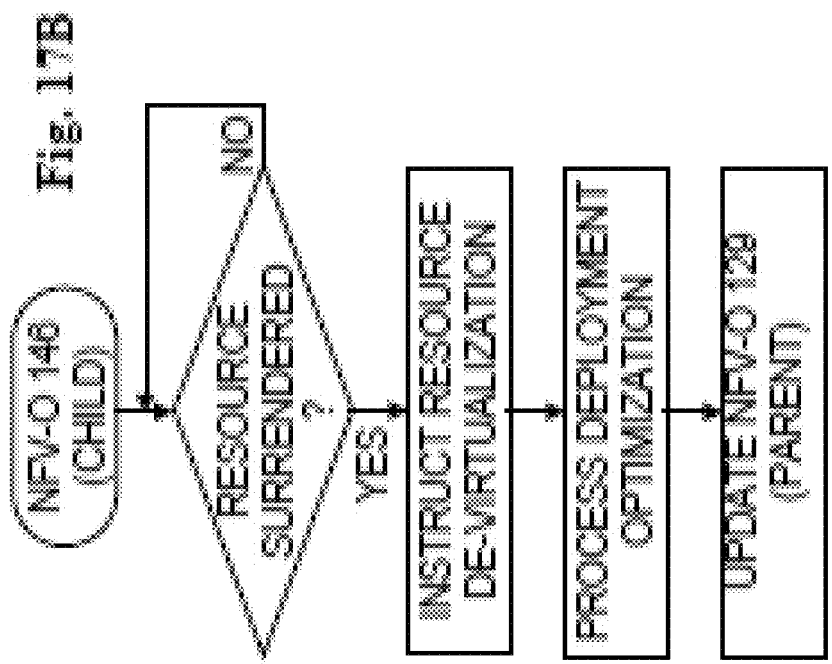

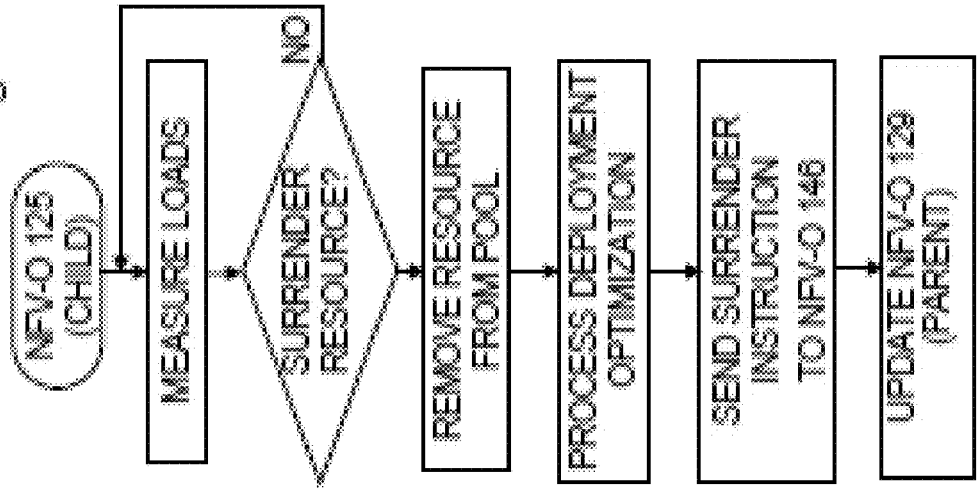

US 9,838,265 B2

SYSTEM, METHOD, AND COMPUTER PROGRAM FOR INTER-MODULE COMMUNICATION IN A NETWORK BASED ON NETWORK FUNCTION VIRTUALIZATION (NFV)

CLAIM OF PRIORITY AND RELATED APPLICATIONS

This application claims the benefit of: U.S. Provisional Application No. 61/918,597, filed Dec. 19, 2013; U.S. Provisional Application No. 61/941,380, filed Feb. 18, 2014; U.S. Provisional Application No. 61/981,116, filed Apr. 17, 2014; U.S. Provisional Application No. 62/026,508, filed Jul. 18, 2014; U.S. Provisional Application No. 62/026,512, filed Jul. 18, 2014; and U.S. Provisional Application No. 62/027,709, filed Jul. 22, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

Consequently, the communication between the within the NFV management layer, between the NFV management layer, and the VNFs, and between VNFs becomes more complex, and much more variable and prone to security hazards. There is thus a need for addressing these and/or other issues associated with the prior art.

SUMMARY

According to one aspect of the present invention there is provided a system, method, and computer program product for communicating information in a communication network using network function virtualization (NFV-based communication network), the method including: sending a communication from a first entity of the NFV-based communication network, the first entity being a sender, and receiving the communication by a second entity of the NFV-based communication network, the second entity being a receiver, where the communication includes: an identification of the sender of the communication, and an identification of the receiver of the communication, an identification of a function associated with the NFV-based communication network, and an authorization associating one or more of the sender and the receiver with the function.

BRIEF DESCRIPTION OF THE DRAWINGS

FIG. 10 is a simplified illustration of a syntax of a communication, in accordance with one embodiment.

FIG. 12 is a simplified illustration of a process-flow part for telephony process, in accordance with one embodiment.

FIG. 13 is a simplified illustration of an instructions part for the telephony process, in accordance with one embodiment.

FIG. 14A-C, taken together, are a simplified illustration of a control flow between three NFV-Os, providing resource reallocation, in accordance with one embodiment.

FIG. 17A-D, taken together, are a simplified flow chart of an example of procedure data flow of the procedure for resource reallocation, in accordance with one embodiment.

DETAILED DESCRIPTION

Figure 1:
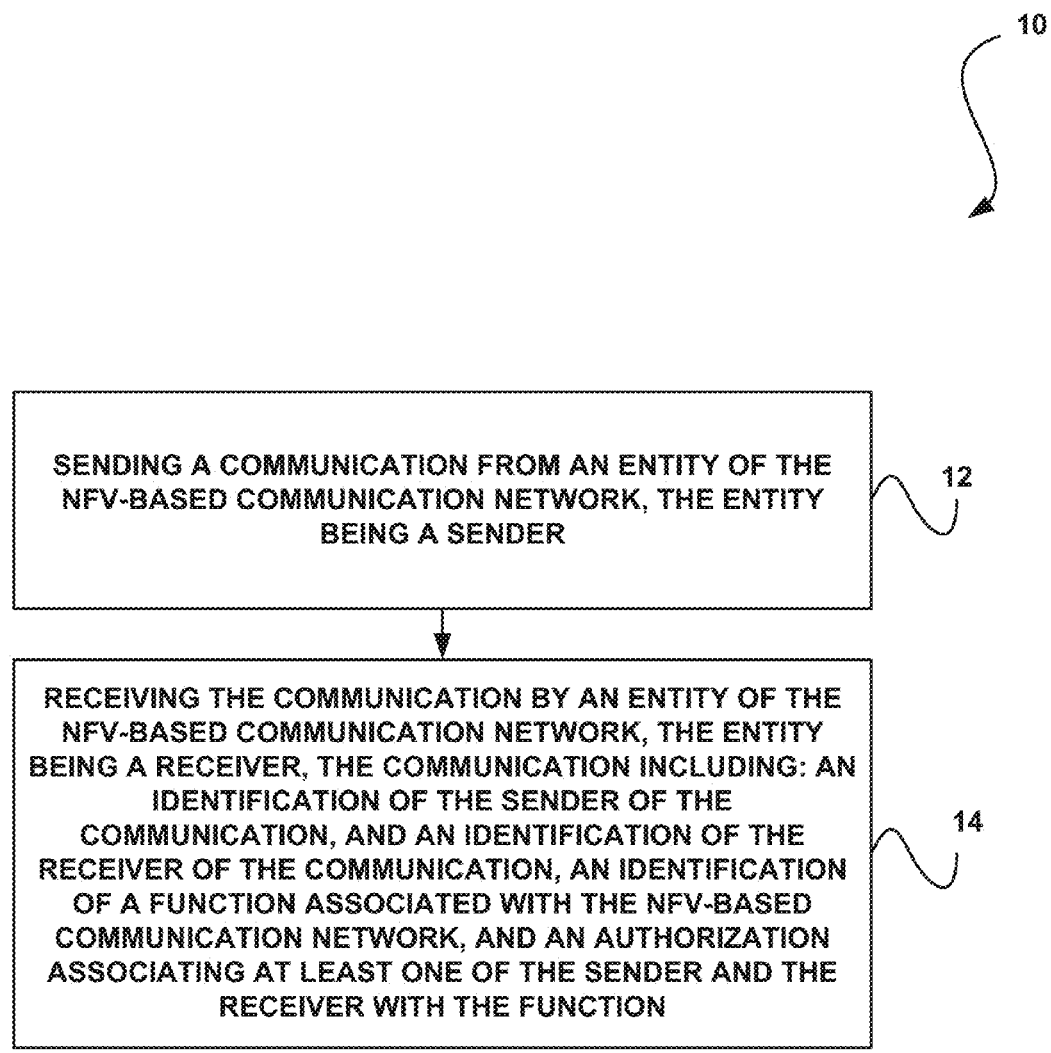
FIG. 1 illustrates a method for communicating information in a communication network using network function virtualization (NFV-based communication network), in accordance with one embodiment.

FIG. 1 illustrates a method 10 for communicating information in a communication network using network function virtualization (NFV-based communication network), in accordance with one embodiment.

As shown in FIG. 1, a communication is sent from a first entity of the NFV-based communication network, the first entity being a sender. See operation 12. The communication is received by a second entity of the NFV-based communication network, the second entity being a receiver. See operation 14.

The communication includes: an identification of the sender of the communication, and an identification of the receiver of the communication; an identification of a function associated with the NFV-based communication network; and an authorization associating at least one of the sender and the receiver with the function.

In one embodiment, the communication may additionally include a record indicating an information type. In this case, the information type may be at least one of the identification of the sender, identification of the receiver, identification of the function, and authorization. Further, the communication may additionally include a value corresponding to the information type, where the information type and the value comprise alphanumeric characters.

Additionally, in one embodiment, the communication may include: an indication that a following value is an identifier of a virtual network function (VNF) followed by a value identifying the virtual network function; and an indication that a following value is an identifier of a VNF instance followed by a value identifying the virtual network function instance.

Still yet, the communication may additionally include at least one of: an indication that a following value is a particular parameter of the virtual network function followed by a value of the parameter; and an indication that a following value is a particular parameter of the virtual network function and a request for a current value of the parameter.

In another embodiment, the communication may include at least one of: an identification of a vendor of the virtual network function; and an identification of a release of the virtual network function.

In another embodiment, the communication may include at least one of: an indication that a following value is an identifier of a sender of the communication followed by a value identifying the sender, and an indication that a following value is an identifier of a receiver of the communication followed by a value identifying the receiver.

Furthermore, the function associated with the communication may be at least one of: an instruction to initiate a function associated with the virtual network function; an instruction to initiate an instance of the virtual network function; a request for a resource associated with the virtual network function; or a procedure associated with a plurality of virtual network functions.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for communicating information in an NFV-based communication network according to various embodiments may be further understood with reference to the following drawings and accompanying description.

Figure 2:
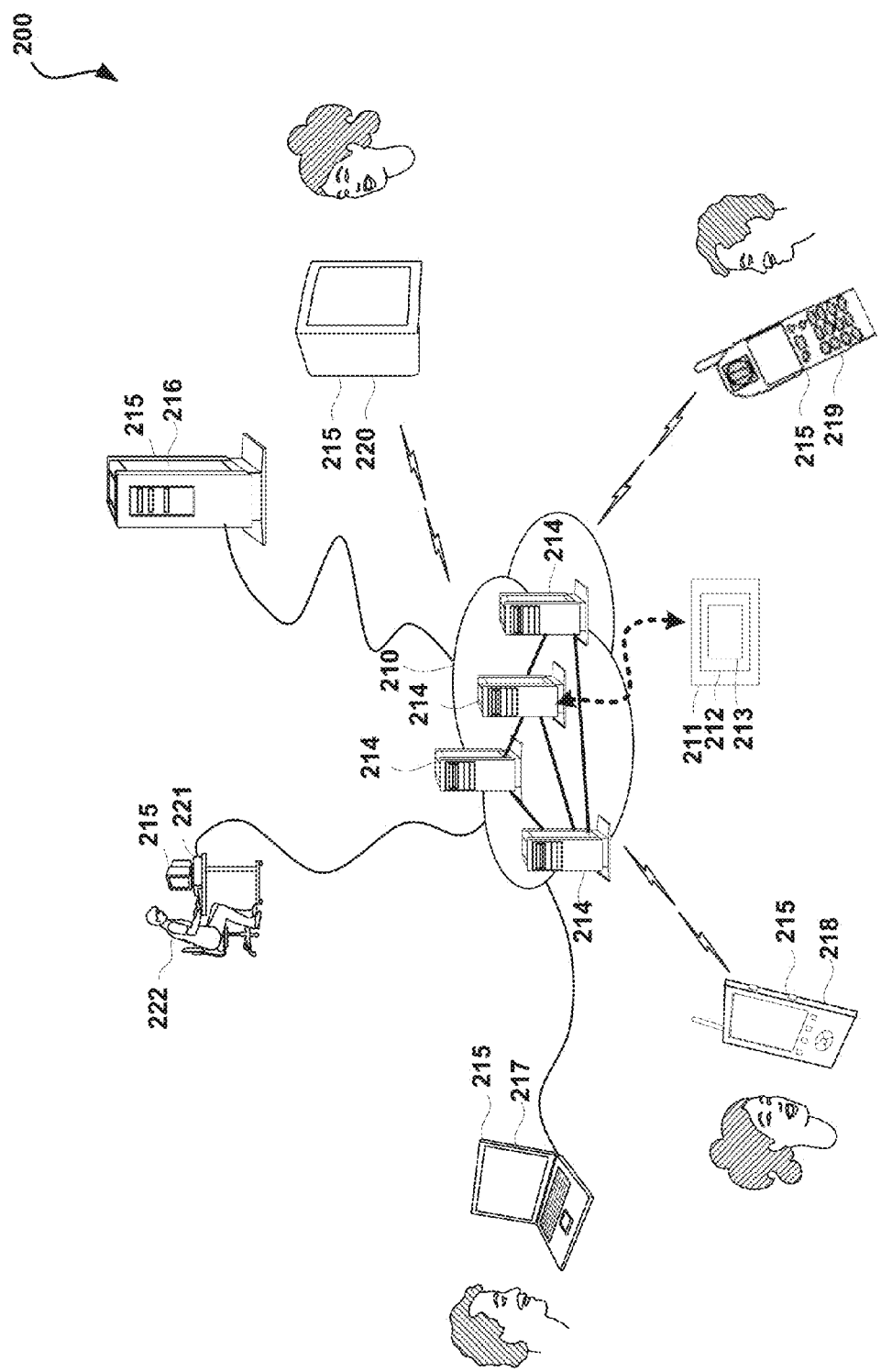
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a protocol management module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the protocol management module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The protocol management module 213 may be a part or a component of the NFV-O module 212. However, the protocol management module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the protocol management module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the protocol management module 213.

Figure 3:
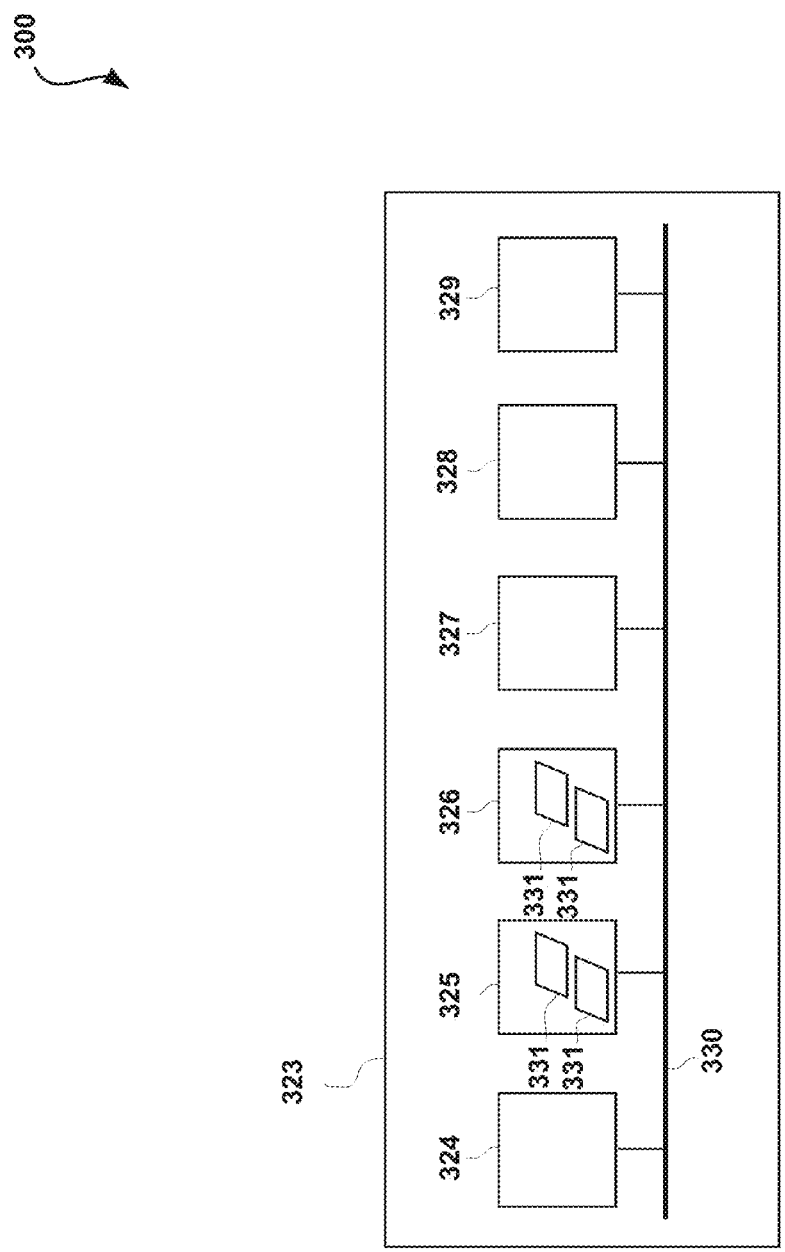
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the protocol management module 213 of FIG. 2.

Figure 4:
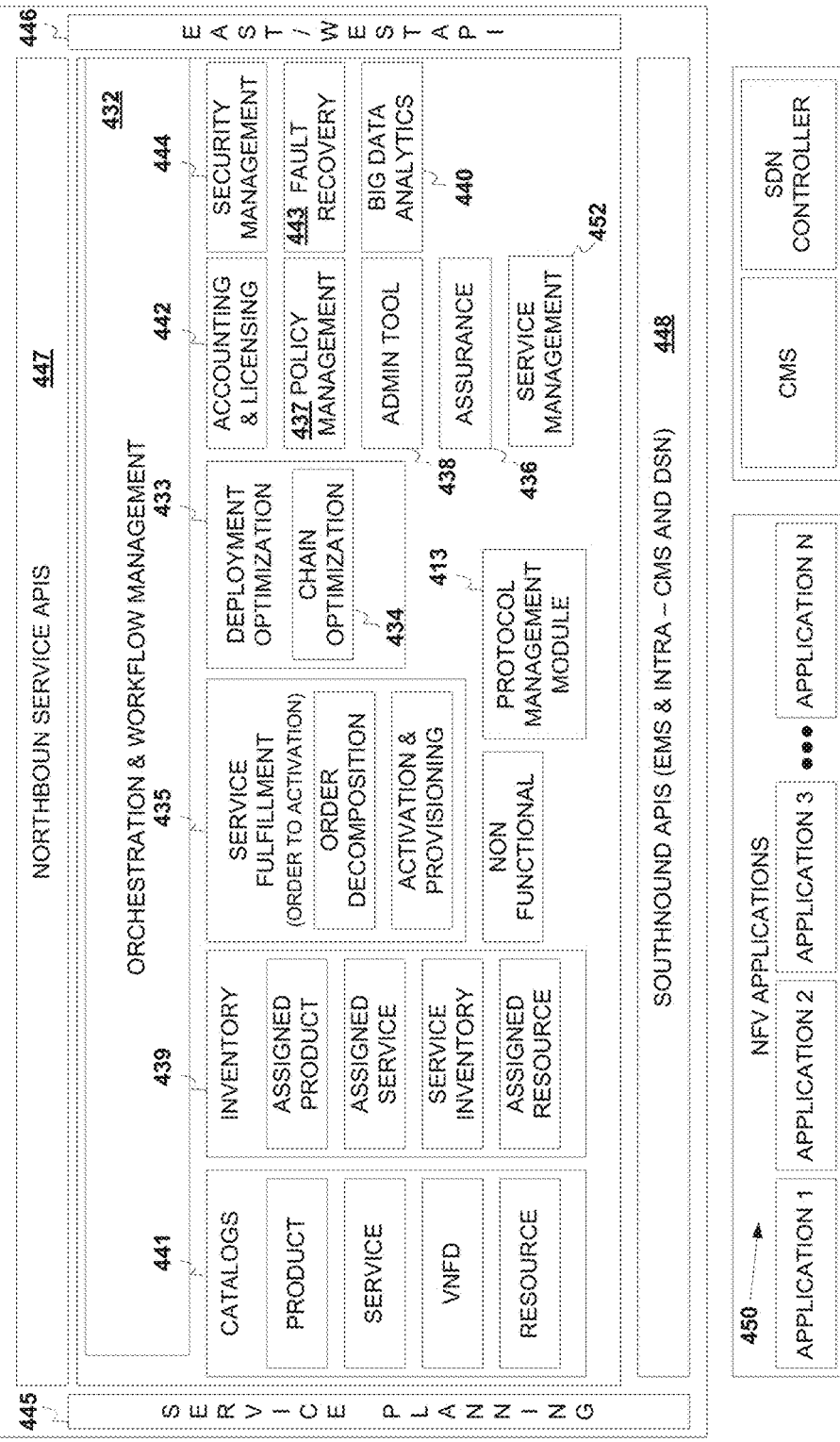
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a protocol management module 413. In one embodiment, the NFV-O module 412 and the protocol management module 413 may represent the NFV-O module 212 and the protocol management module 213 of FIG. 2, respectively. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The protocol management module 413 may also be part of the NFV-O module 412. The protocol management module 413 is operable to facilitate communication between various components of the NFV-based network. Particularly, the protocol management module 413 is associated with the following types of communication: communication between modules of the NFV-based network itself, particularly, modules managing the NFV-based network as a computational facility, particularly, modules of the NFV orchestration layer (e.g., the NFV-O 412); communication between modules of the NFV-based network and modules managing a data-center (DC) or a cloud management system (CMS), particularly, modules of the NFV orchestration layer and modules managing a data-center (DC) or a cloud management system (CMS); communication between modules of the NFV-based network and VNFs, particularly, between modules of the NFV orchestration layer and VNFs and VNF-instances in hardware units of the NFV-based network, VNFs in data-centers (DC), and VNFs in CMSs; communication between VNFs, and particularly between VNF-instances, of the NFV-based network; and communication between two or more NFV-based networks involving any of the communication types listed above. The communication also includes: communication between modules of different NFV-based network that are managing their respective NFV-based network, particularly, communication between modules of the NFV orchestration layer of different NFV-based networks; and communication between VNF-instances of different NFV-based networks.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities-receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
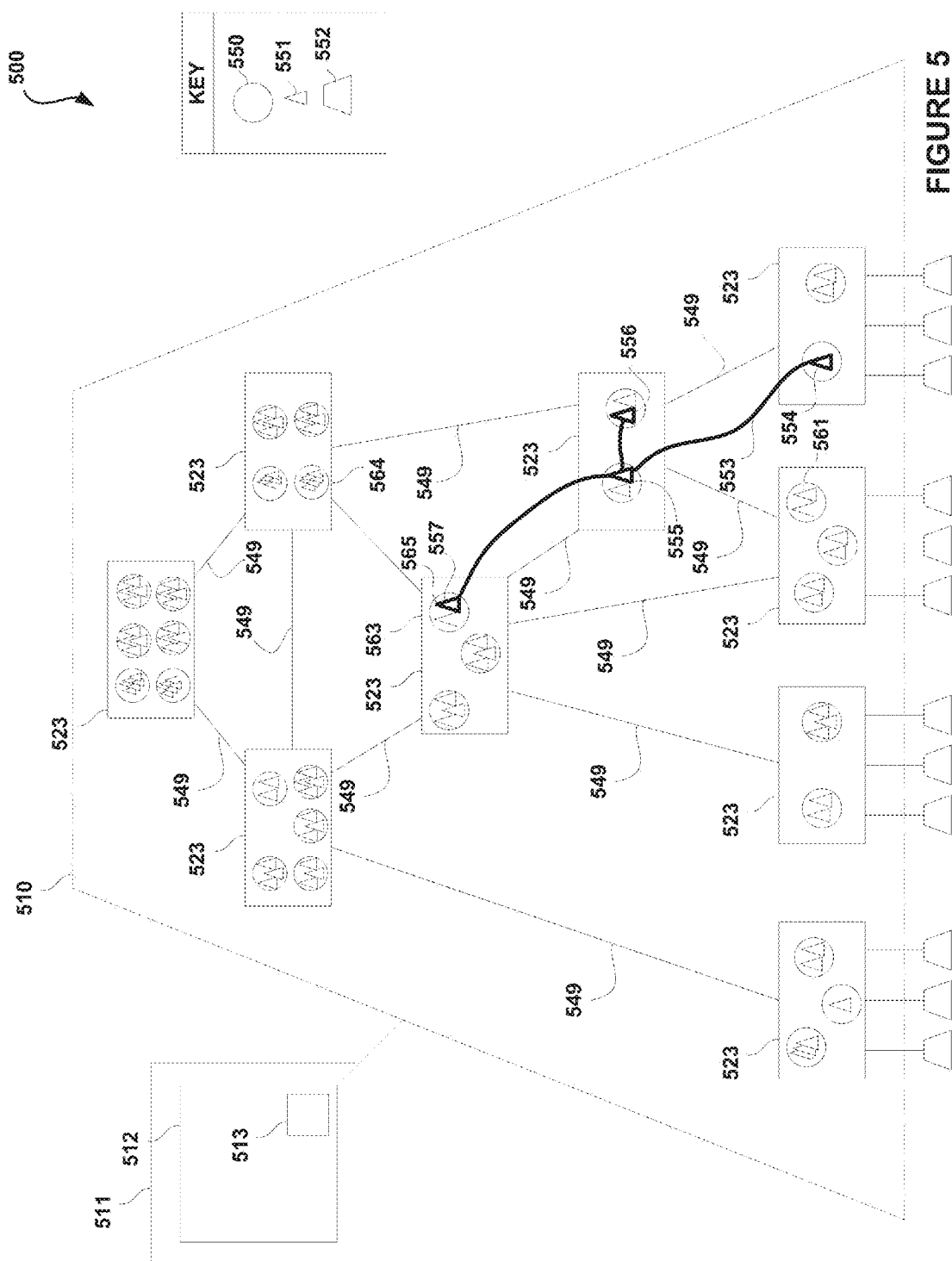
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a protocol management module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
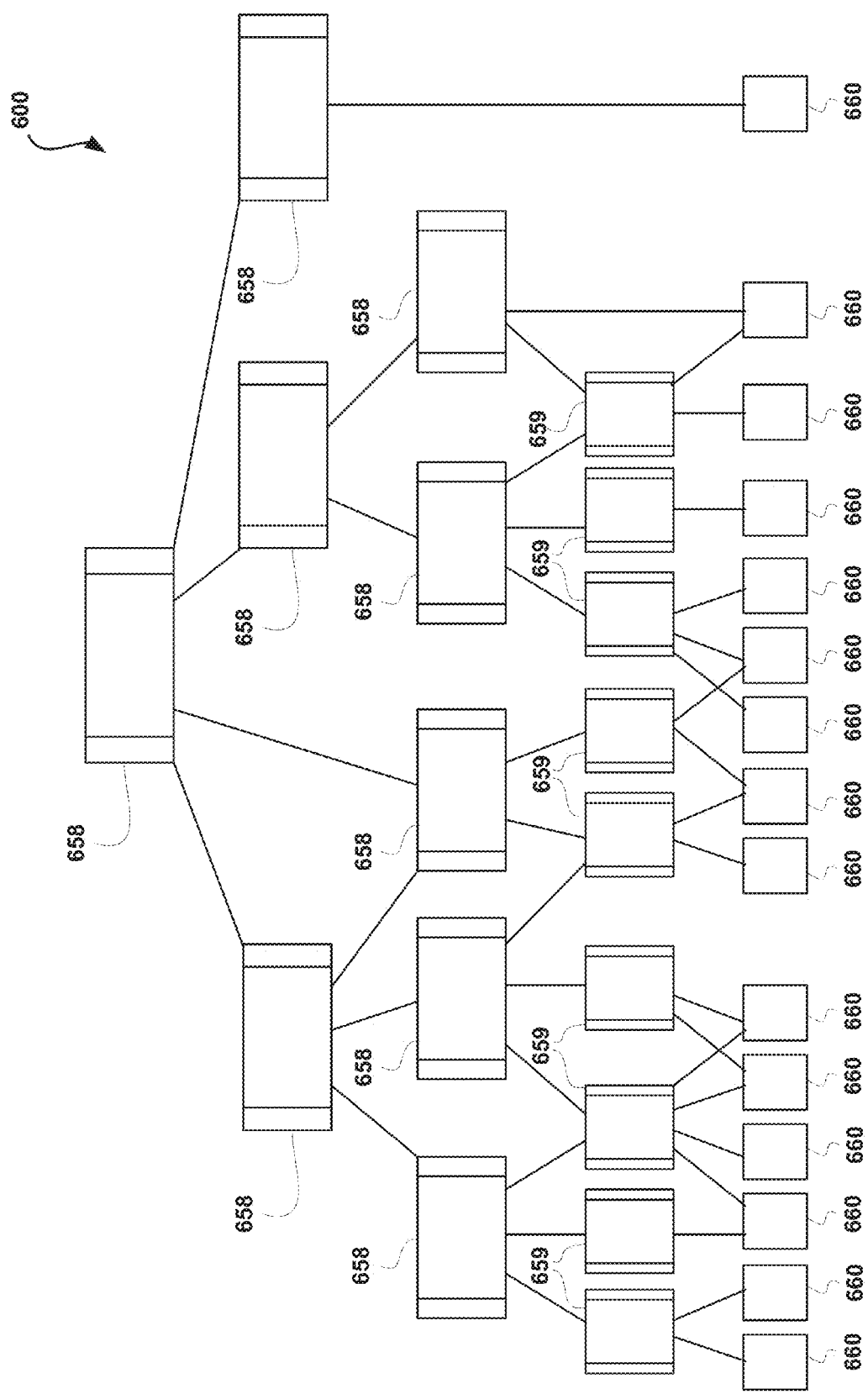
FIG. 6 illustrates a simplified diagram of a distributed deployment of an NFV-MANO (Management and Orchestration), in accordance with one embodiment.

FIG. 6 illustrates a simplified diagram 600 of a distributed deployment of an NFV-O, in accordance with one embodiment. As an option, the diagram 600 may be viewed in the context of the details of the previous Figures. For example, in one embodiment, the distributed deployment of the NFV-O may represent the NFV-based networks and associated elements described in the context of the previous Figures. Of course, however, the diagram 600 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 658 and a leaf component 659. The NFV-O core component 658 can be a child of another core component 658, and/or a parent of one or more core components 658 or leaf components 659. A leaf component 659 cannot be a parent of a core component 658 or a leaf component 659.

Orchestration parameters managed by a particular leaf component 659 or core component 658 may be reported in real-time to the supervising (parent) core component 658. In addition to the supervision, this continuous updating process enables the supervising component to provide backup, and/or support recovery processes associated with hardware and/or software faults as well as security faults and/or breeches.

To provide redundancy, a leaf component 659 may be supervised by two or more core components 658, and child core components 658 may be supervised by two or more parent core components 658. The orchestration parameters managed by a particular core component 658 or leaf component 659 may also be mirrored to the backup core components 658. Optionally, the NFV-O core components 658 may have the same fully functional orchestration capabilities, while leaf components may be limited to simple, well defined and localized sub-orchestration tasks, and thus may provide a faster response to demands and changing load.

A cloud management system (CMS) 660 is a software package managing one or more hardware units operating one or more VNFs and executing one or more VNF instances. A CMS 660 can be managed by one or more leaf components 659 or core components 658, or combinations thereof. A CMS 660 can be located in the operator's premises or in the customer's premises or partly in both.

An NFV-O component such as a core components 658 or a leaf component 659 typically orchestrates a particular, predefined, territory. The territory may be one or more cloud management systems 660, one or more services, one or more customers, etc. Therefore, there can be an overlap between territories of different NFV-O components. For example, one NFV-O component may orchestrate a CMS 660, another NFV-O component may orchestrate a service that is at least partly provided by the same CMS 660, and additionally a third NFV-O component may orchestrate services for a particular customer connected to that same CMS 660.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 659 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 658 or leaf components 659 it supervises. Thus, such parent core component 658 may perform deployment optimization in terms of requirements and load values applied to whole subordinate (child) core components 658 or leaf components 659.

A customer may use the services of several telecom operators. For example, the customer may be an international company operating in several countries. Such a customer usually establishes a virtual private network (VPN) across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and a chain optimization module) of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

According to one embodiment, a protocol management module may be implemented in the context of any FIG. 6, and/or in the context of any of the preceding or subsequent figures, as a computer software program for managing functions and features associated with various types of communication. Such communication may include communication between modules of the NFV-based network itself, such as: communication between modules comprising the NFV-O hierarchy, such as between core components 658, and between core components 658 and leaf components 659, as shown and described with reference to FIG. 6; communication between modules comprising an NFV-O, as shown and described with reference to FIG. 4 (including, for example, communication between modules comprising a particular core component, or a particular leaf components); communication between modules of the NFV-based network and modules managing a hardware unit, including, but not limited to, modules managing a data-center (DC) or a cloud management system (CMS), such as CMS 660 of FIG. 6; communication between a module of an NFV-O (such as a core component or a leaf component) and VNFs or a VNF instance (the VNFs typically installed and operating as a VNF instance in a hardware unit of FIG. 5 or a CMS of FIG. 6, etc.); communication between VNF instances; and communication between two or more NFV-based networks involving any of the communication types listed above.

The communications according to the types listed above typically carry control data and/or content. Control data refers to commands sent by one module to another including instructions regarding what to do, how to do it and when to do it. Control data also refers to reports sent by one module to another including information regarding what to what has been done, how it was done, and when it was done. Content refers to information transferred between the modules to be processed by each module according to the control data.

The modules executing communication according to the communication types listed above (such as an NFV-O, core component 658, leaf component 659, and their modules, VNFs and/or VNF instance) uses communication mechanisms as described below, including, but not limited to: protocol security, protocol conversion, and process control.

The communications according to the types listed above typically carry identification, authentication and authorization data, so that each party along the communication route can verify that each communication is sent by the proclaimed module, and is received by the proclaimed module, and that these modules are authorized to send or receive the communication. Additionally, the communications according to the types listed above are typically encrypted.

Services may be provided by a plurality of VNFs from different vendors having different sets of control formats and content formats. Furthermore, an NFV-O may replace a VNF in a chain (service) with another VNF of a different make and thus using a different format for the control data and/or content. Consequently, the communications according to the types listed above typically carry means enabling format conversion as required by the receiving VNF (or VNF instance).

A typical process has some kind of memory, or local data, that processing software program maintains for the duration of the process. This memory is typically maintained in the processor's local memory or, as in typical Internet applications, in the terminal device. A service typically maintains a process for each terminal device. Such process may be provided by a plurality of VNF instance executing in a plurality of hardware units. Furthermore, a VNF instance may migrate between hardware units during the execution of a process. Therefore, communications according to the types listed above typically carry the memory of their respective process. Such memory may include forward looking instructions, current information, a state of a relevant state machine, history of the current process, etc.

It is appreciated that the communication mechanisms described above are interlinked. In that regard, the each part of the process memory carried by the communication is secured, encrypted, and authenticated. The protocol conversion mechanism is also operative to convert, or translate, each part of the process memory carried by the communication, according to the needs and requirements of the receiving VNF (or VNF instance).

The receiving VNF instance may send a communication received to be translated (or converted) by another VNF instance. Communicating security-sensitive information to a translating party requires additional security measures. For example, a customer may require that such protocol-conversion VNF instance is operative exclusively, or processing only communications bound to or from VNF instances serving the particular customer. A customer also may require that protocol-conversion VNF instance reside in a particularly secured area (e.g. protected by a firewall), etc.

Alternatively, the receiving VNF instance may download a piece of software program for translating (or converting) the particular type of communication. Such protocol-conversion programs may be available from a protocol-conversion VNF instance. Such automatic downloading of software program by VNF instances may require additional security measures. For example, a customer may require that such the VNF instance from which protocol-conversion programs are downloaded is operative exclusively for the particular customer (e.g., processing requests from VNF instances serving the particular customer only). A customer also may require that protocol-conversion VNF instance reside in a particularly secured area (e.g. protected by a firewall), etc.

Figure 7:
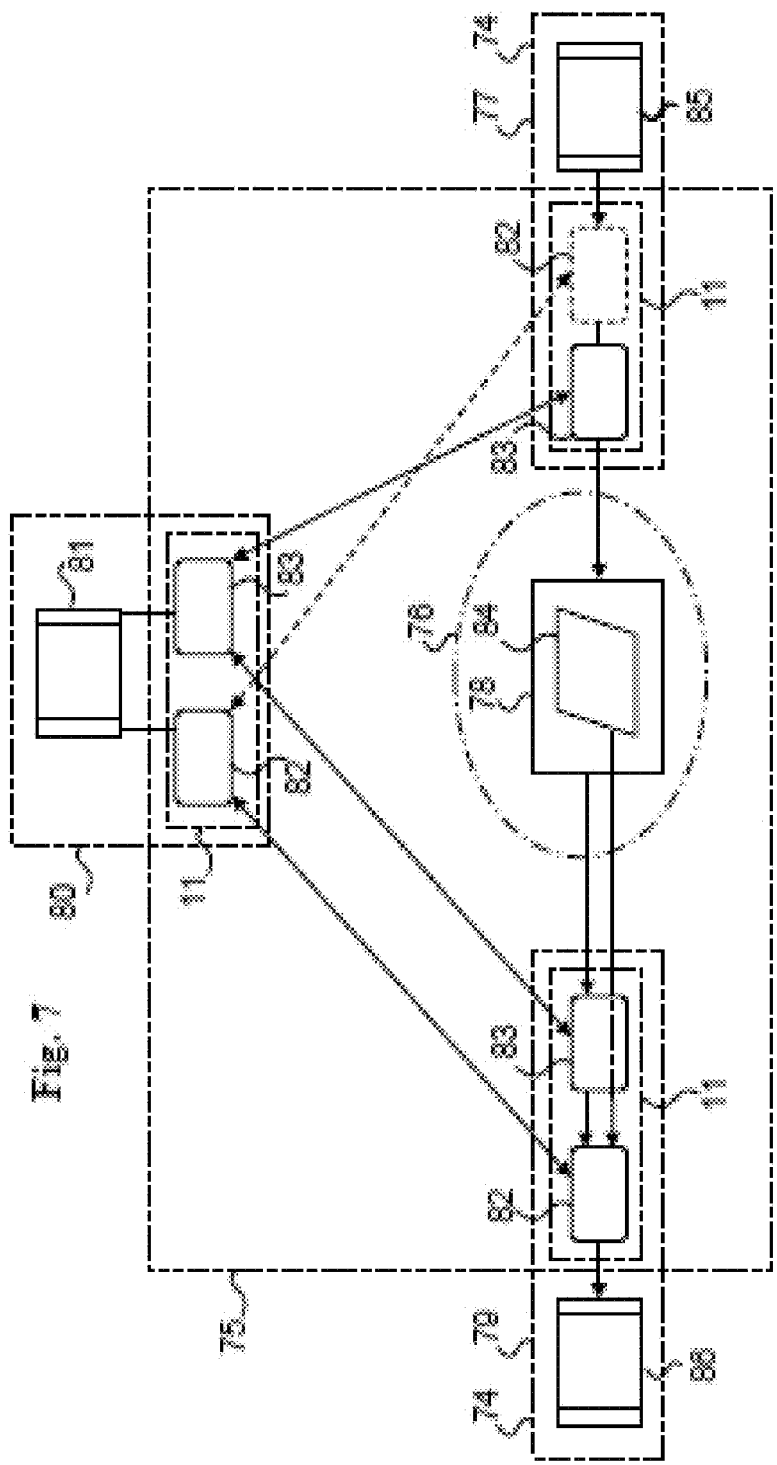
FIG. 7 is a simplified block diagram of entities of a NFV-based network communicating using protocol management system, in accordance with one embodiment.

Reference is now made to FIG. 7, which is a simplified block diagram of entities 74 of an NFV-based network communicating using protocol management system 75, according to one embodiment. As an option, FIG. 7 may be viewed in the context of the details of the previous Figures. For example, the protocol management module 11 of FIG. 7 may represent the protocol management modules 213, 413, and 513 of FIGS. 2, 4, and 5, respectively. Of course, however, FIG. 7 may be viewed in the context of any desired environment. Further, the aforementioned definitions may equally apply to the description below.

It is appreciated that protocol management system 75 manages a VNF communication protocol 76 within one or more NFV-based networks, and/or between entities of one or more NFV-based network, such as NFV-O entities, VNF entities, and CMS entities. VNF communication protocol 76 enables the exchange of data between one or more NFV-based networks, and/or between the entities of one or more NFV-based networks. VNF communication protocol 76 is therefore a method, a structure, and/or format for data exchange. Protocol management system 75 is therefore a distributed system, typically having components of the protocol management system 75 embedded in the various components or entities of the NFV-based networks. Typically, these embedded protocol management system 75 components execute or supervise the VNF communication protocol 76.

FIG. 7 shows one entity 74 designated by numeral 77 (the sender) sending a communication (or command) 78 to another entity 74 designated by numeral 79 (the receiver) under the supervision of a supervising entity 80 such as an NFV-O. It is appreciated that the supervising entity 80 typically uses protocol management module 11 to supervise the communication between entities 74. The supervising entity 80 of FIG. 7 is represented by a module 81 of an NFV-O and protocol management module (e.g. of the preceding figures, etc.). Module 81 may be any of the NFV-O entities as disclosed above with reference to previous figures.

It is appreciated that the two entities 74 of FIG. 7 may represent any number of entities 74. It is appreciated that entities 74 may be part of the same NFV-based network or may belong to different NFV-based networks. It is also appreciated that the NFV-O of FIG. 7 may represent a plurality of NFV-Os. It is further appreciated that such plurality of NFV-Os may belong to the same NFV-based network or to a plurality of different NFV-based networks.

An entity 74 may be any module of an NFV-based network, including but not limited to: an NFV-O module, a DC or CMS (such as a CMS of FIG. 6, etc.), a VNF or a VNF instance (such as s VNF and VNF instance 54 of FIG. 5, etc.). It is appreciated a communication such as communication 78 or a variation of communication 78 can be exchanged between entities of one or more NFV-based networks such as: between NFV-Os of different NFV-based networks; between NFV-O modules, such as core components and leaf components of the same or different NFV-based networks; and between NFV-O modules, such as the modules shown and described with reference to FIG. 4, etc.

Such NFV-O modules may belong to: the same core component; different core components of the same NFV-O and/or NFV-based networks, sharing the same parent core component; different core components of the same NFV-O and/or NFV-based networks, having different parent core components (e.g. an NFV-O module of a core component managing a geographical locality of VNF instances communicating with an NFV-O module of a core component managing a service); NFV-Os of different NFV-based networks; and different core components of different NFV-based networks.

Further, communication such as communication 78 or a variation of communication 78 can be exchanged between entities of one or more NFV-based networks such as: between NFV-O, or its modules (such as a core component, a leaf components and/or modules such as the modules shown and described with reference to FIG. 4), and a DC or CMS (such as a CMS FIG. 6); between NFV-O or its modules (such as a core component, a leaf components and/or modules such as the modules shown and described with reference to FIG. 4), and a VNF or a VNF instance (such as in FIG. 5, etc.), for example residing in a hardware unit, a DC or CMS; and between one or more VNFs and/or VNF instances (such as a VNF and VNF instance of FIG. 5, etc.).

As shown in FIG. 7, protocol management system 75 includes a protocol conversion module 82 and a security module 83 (security module 83 may alternatively be part of the security management module of FIG. 4, etc.). Communication 78 typically includes data 84 within a security (e.g. authentication and encryption) envelope as detailed below.

Additionally, as seen in FIG. 7, components of protocol management system 75 can be distributed between entities 74 and the supervising entity 80 in various configurations. For example, communication 78 may be sent from sender 77 to receiver 79 via supervising entity 80. As another example, communication 78 may be sent from sender 77 to receiver 79 directly, and receiver 79 can then send communication 78 to supervising entity 80 for authentication, decryption and/or conversion as needed. As another example, communication 78 may be sent from sender 77 to receiver 79 directly, and receiver 79 can then use components of protocol management system 75 for authentication, decryption and/or conversion as needed. The required components (e.g., components of protocol conversion module 82 and a security module 83) can be obtained (e.g., downloaded) by any of sender 77 and/or receiver 79 from supervising entity 80 or any other means of the respective NFV-O.

In the example of FIG. 7, the protocol management modules 11 of the protocol management system 75 supervise the exchange of communication 78 according to VNF communication protocol 76 in a manner that is transparent to the sending module 85, the receiving module 86, and/or supervising module 81. In this respect, the protocol management module 11 of a particular entity may determine the manner in which a communication 78 is exchanged between the entities, and/or where any part of the processing of VNF communication protocol 76 is executed.

Sender 77 and/or receiver 79 and/or supervising entity 80 may obtain and/or use (execute) a component of protocol management system 75 as a module, as a VNF 53, as a VNF instance 54, etc.

For example, to support authentication, security module 83 operated (used) by a sender 77 and/or a receiver 79 may register itself, and or any communication 78 with the security module 83 operated by the respective supervising entity 80, thereby enabling a receiver 79 to authenticate with the security module 83 operated by the respective supervising entity 80 any communication 78 received from the respective sender 77.

Optionally or alternatively, a sender 77 may use protocol conversion module 82 to create a communication 78 in a standard format and/or language.

Figure 8:
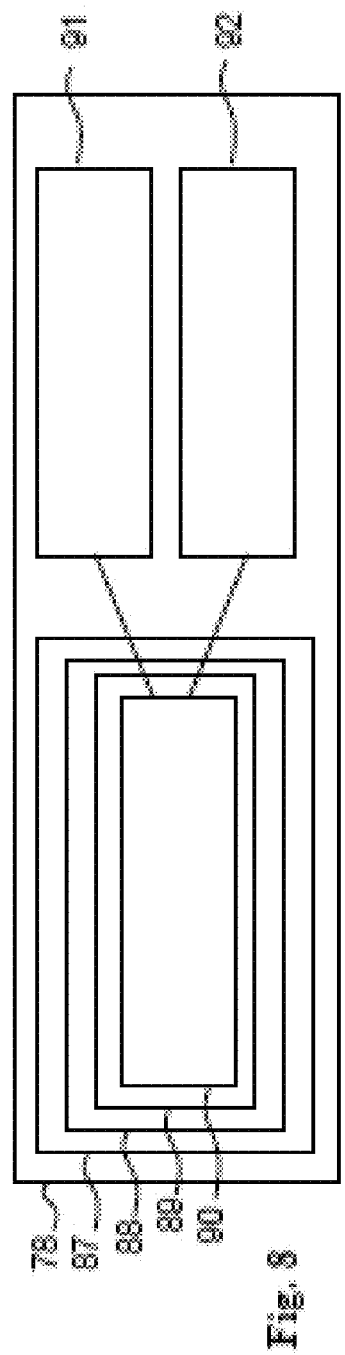
FIG. 8 is a simplified block diagram of main components of communication, in accordance with one embodiment.

Reference is now made to FIG. 8, which is a simplified block diagram of main components of communication 78, according to one embodiment. As an option, FIG. 8 may be viewed in the context of the details of the previous Figures. Of course, however, FIG. 8 may be viewed in the context of any desired environment. Further, the aforementioned definitions may equally apply to the description below.

A communication 78 typically includes a security component including elements 87 providing, supporting or associated with: identification, encryption, authentication (e.g. of an identity), and authorization (e.g. to perform a particular function). The communication 78 also typically includes: a conversion component including elements 88 associated with protocol conversion, such as the type, vendor, and/or release of a particular module sending or receiving or otherwise associated with communication 78 (e.g. modules 85 and/or 86 of FIG. 7); and a procedure component 89, typically defining a procedure associated with communication 78. The procedure typically associates communication 78, or parts of communication 78, with particular entities of NFV-based networks.

The communication 78 may also include: one or more instructions 90; memory (and/or history) 91 of one or more procedures, instructions and execution associated with communication 78; and information, data, and/or content 92.

The communication 78 may also include: one or more orchestration support information. Orchestration support information may be embedded in a communication 78 by one or more NFV-O components, for example, to provide the NFV-O component with information regarding current and future load data. Orchestration support information may be part of the procedure component 89, or provided as one or more instructions 90. The orchestration support information may be intended to one or more of the VNF instances processing the communication 78, and/or the procedure defined within the communication 78.

According to the orchestration support information relevant to the particular VNF instance, the VNF instance may report to the respective NFV-O module information relating to load, change of load, anticipated change of load, change or anticipated change of requirements such as requirements for resources, etc. The orchestration support information may therefore include orchestration support rules and orchestration support data. Orchestration support rules may be in the form of scripts, or short code, for analyzing particular data and generating one or more corresponding alert messages, where the respective VNF instance sends the alert messages to the respective NFV-O component. Orchestration support data may include, for example, threshold values and/or other quantitative conditions by which the respective VNF instance analyzes the current situation (for example using the orchestration support rules), and/or formulates the alert message.

Orchestration support information, including orchestration support rules and orchestration support data may, as well as their respective alarm messages, may relate to any type of load such as processing power, memory, storage, communication bandwidth, latency and jitter, etc. However, orchestration support information may also relate to particular processing situations such as the frequency of using a particular process (module), same or particular data records, same or particular Internet address, the frequency of a particular irregularity or exception, etc.

It is appreciated that in one embodiment the orchestration support information is associated with the particular procedure, or service, for which the communication 78 pertains. Therefore, the orchestration support information may be processed by the relevant VNF instance each time (and/or only when) the VNF instance receives and/or processes the particular communication 78.

It is appreciated that these components intervene with each other. For example, various elements of security and conversion components may be applied to various elements of procedure and memory components. Therefore, each of elements 87-92 of FIG. 8 represents a plurality of elements of such type of component.

Figure 9:
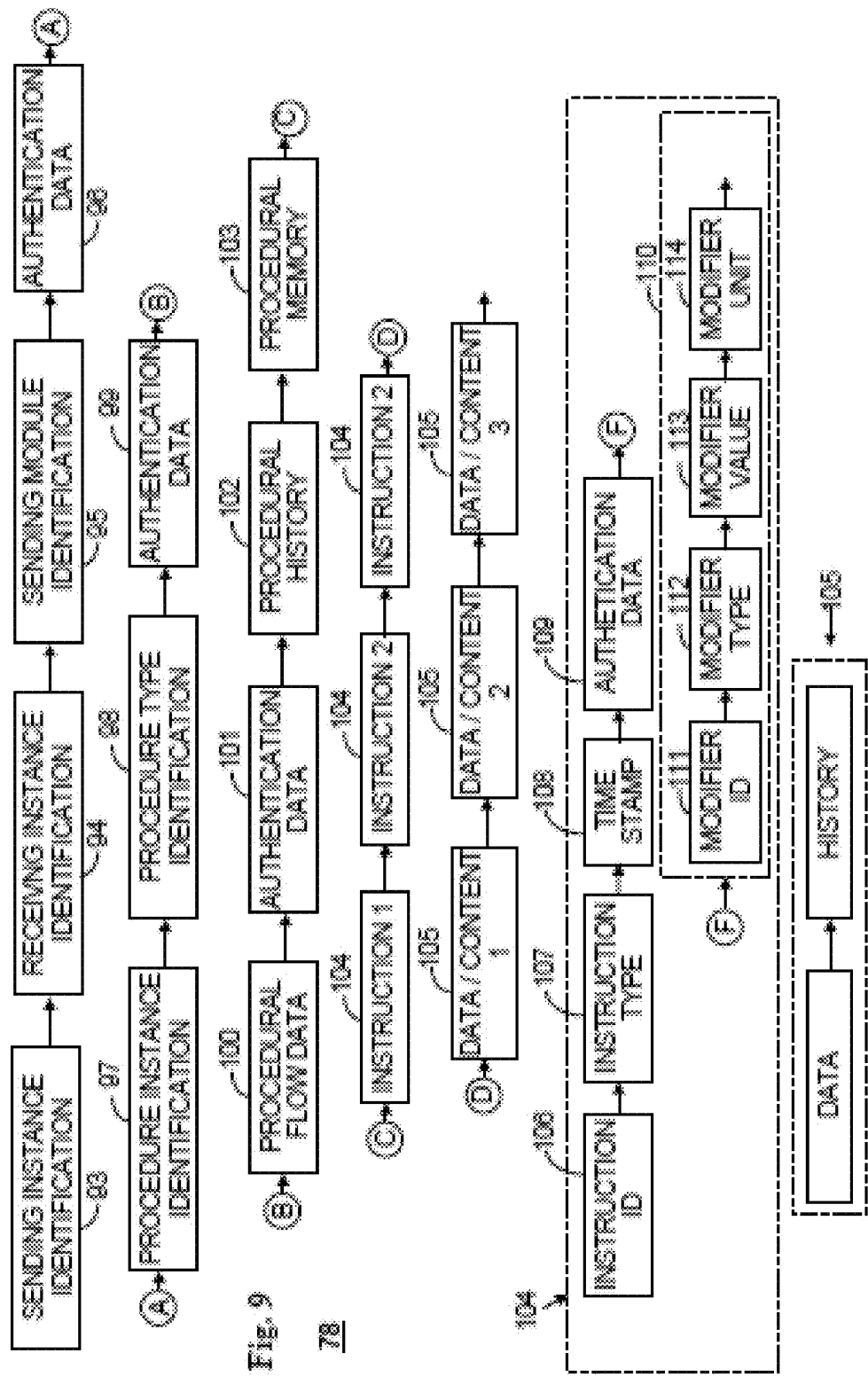
FIG. 9 is a simplified block diagram of detailed components of communication, in accordance with one embodiment.

Reference is now made to FIG. 9, which is a simplified block diagram of detailed components of communication 78, according to one embodiment. As an option, FIG. 9 may be viewed in the context of the details of the previous Figures. Of course, however, FIG. 9 may be viewed in the context of any desired environment. Further, the aforementioned definitions may equally apply to the description below.

As shown in FIG. 9, communication 78 typically includes various communication elements as listed below. It is appreciated that the order of data elements communicated within communication 78 may be arbitrary.

Sending instance identification 93 includes a unique identification of the instance of the module sending the particular communication 78. The term "module" refers to a software program, such as a VNF, a module of an NFV-O, etc. The term "instance" refers to an instance such as a task or a thread executing the module, such as a VNF instance. However, the term "sending instance" may also refer to an NFV-O, a core component, a leaf component, a CMS, etc. The term "unique identification" means that the receiver of communication 78 can identify the sending instance and authenticate that that this sending instance is authorized to send the particular communication 78 or otherwise be involved with the procedure associated with the particular communication 78.

Receiving instance identification 94 includes a unique identification of the instance of the module to which the particular communication 78 is sent. The terms "module" and "instance" are as described above. The term "unique identification" means it is possible to authenticate that the receiving instance is authorized to receive the particular communication 78.

Sending module identification 95 includes a unique identification of the type of module sending the particular communication 78. The identification includes identification of the organization developing the software program (e.g. the vendor of the software program), identification of the software program itself, and identification of the particular release of the software program, etc. If a translator (conversion) module is used by the receiving module to translate (or convert) communication 78 the receiving module may add here a receiving instance identification.

Authentication data 96 enables the sending instance to verify that only the intended receiving instance can decrypt communication 78 (or its relevant component). Authentication data 96 also enables the receiving instance to verify that it is the intended sending instance that originated the particular communication 78. Authentication data 96 also enables other modules (such as security modules) of NFV-based networks to verify the authenticity of communication 78.

It is appreciated that communication 78 may include data sent by a plurality of sending instances and directed to various receiving instances. Therefore, communication 78 may include several strings of elements 93, 94, 95 and 96. Each string of elements 93, 94, 95 and 96 enables the authorized instance to read and/or change the particular data.

Procedure instance identification 97 includes a unique identification of the particular procedure instance for which communication 78 pertains. It is appreciated that a procedure, being a piece of software program, can be invoked repeatedly as one or more instances of the procedure. For example, in case the receiving instance is involved with several instances of the same procedure. For example, when the same procedure serves different users, or when the same user invoked the same procedure for different data or content items. It is appreciated that a procedure may span several modules and/or VNF instances (such as a service including several VNF instances). The procedure instance identification 97 enables each of the modules and/or VNF instances to associate between the particular communication 78 and the appropriate instance of the procedure.

Procedure type identification 98 includes a unique identification of the particular type of the procedure to which communication 78 pertains. The procedure identification designates a service, or a sub-service, that a module (such as a VNF), or a chain of modules (e.g. VNFs) provide. It is appreciated that a procedure type may identify a particular software program, or a module of a software program, or a particular group or sequence (chain) of software programs, or modules of one or more software programs.

Procedure authentication data 99 enables the sending instance, the receiving instance, as well as other modules (such as security modules) of NFV-based networks to verify that the particular procedure is properly authorized. It is appreciated that such authorization may pertain, or be limited, to the particular sending instance, receiving instance, and other entities involved.

Procedure data flow 100 includes a work-flow for the entire procedure. The work flow typically lists the functions from which the particular procedure is made. These functions are provided, and/or performed, and/or executed, by one or more of the modules (e.g. VNFs) making up the procedure and/or service. Therefore, the procedure data flow 100 may include the list of modules (e.g. VNFs) as well as the list of particular instances (e.g. VNF instances that execute these VNF modules) that are authorized to process the particular procedure and/or service. The procedure data flow 100 may therefore include a state-machine, including conditions for the transitions between the states of the state-machine. In such case, the procedure data flow 100 also indicates the current and previous states.

The work flow is typically set by the instance initiating a procedure and/or service. However, other instances, and particularly modules of an NFV-O, may alter, add, or delete elements of the work-flow. Particularly, an initiating instance may designate module types (e.g. VNFs) while an NFV-O may designate specific instances (e.g. VNF instances).

It is appreciated that while the examples herein use the terms VNFs and VNF instances, the procedure as well as the elements listed herein may include any modules of NFV-based networks including modules of NFV-O, core components and leaf components.

Procedure flow authentication data 101 enables a receiving entity and/or instance (and their security modules) of NFV-based networks to verify that the particular procedure flow is properly authorized.

Procedure history 102 includes a track of the functions executed by the procedure so far. For example, procedure history 102 includes all the states and their corresponding transitions as transversed by the procedure, including, for example, the data relevant to the conditions for the respective transitions. The procedure history 102 may therefore enable roll-back-recovery in case of hardware, software, or security fault.

Procedure memory 103 includes, for example, the global memory of the particular procedure and the local memory for the modules and instances being part of the particular procedure (such as VNFs and VNF instances). Each of the memory items (data) can be encrypted by the relevant VNF and VNF instance for additional security.

Instruction 104 includes one or more of the actions or functions that the receiving instance should execute, and data/content 105 include the data or content that is relevant for the instruction 104.

Instruction 104 is a data structure including various components or elements, such as a unique Instruction ID 106, allocated by the entity sending instruction 104, and enables the security mechanism to validate the particular instruction 104. For example, the sending entity creates an encrypted random number and the security mechanism can validate that the particular instruction 104 has been generated by the sending entity. Instruction 104 may also include: instruction type 107, which identifies the type of the instruction to the receiving entity; a time stamp 108; authentication data 109 (similar to authentication data 96 and/or 99); and one or more modifiers 110.

The modifier 110 is a parameter, and it typically includes one or more of the following data elements: a modifier ID 111 (similar to instruction ID 106); a modifier type 112 identifying the type of the parameter; a modifier value 113; and a modifier unit 114.

The instruction type 107, modifier type 112, and modifier value 113 are typically particular to the instruction generated by a particular type and version of the sending entity. The receiving entity may not recognize these particular elements, and may therefore use a protocol conversion mechanism to translate the received instruction type 107, modifier type 112, and modifier value 113 into useful data. For example, the protocol conversion mechanism may translate the received instruction type 107, modifier type 112, and modifier value 113 into similar elements that the receiving entity is able to process.

Data/content 105 includes any type of data (e.g., numeral, textual, image, audio, video, etc.). Data/content 105 may include current data as well as temporary, non-committed data, and/or historical data for roll-back recovery.

The elements of communication 78 are typically provided in a self-descriptive manner (e.g. self-describing or self-documenting) such as common for markup languages (e.g. JSON). The elements of communication 78 are typically provided using human readable means, such as UNICODE characters.

All the data elements are self-describing in the sense that each data element typically includes a type identification followed by the associated value. Therefore, the order of data elements within a data type is arbitrary. For example, the position of an instruction 104 within a communication 78 is arbitrary, the position of a modifier 110 within an instruction 104 is arbitrary, and the position of each modifier data type (e.g. elements 111, 112, 113, and 114) within a modifier 110 is arbitrary.

Communication 78 is encrypted and authenticated. Encryption and authentication measures typically use a pair of encryption-decryption keys, also known as public and private key pair, or public key system, public key cryptography, etc.

For example, the entire communication 78 may be encrypted using the public key of the receiving entity. For example, all or some of the data elements of communication 78 may be encrypted using the public key of the sending entity for sender authentication. For example, authentication data (such as elements 96, 99, and 109 of communication 78) may include authorization code encrypted using the public key of the authorizing entity. For example, memory items such as data elements that may be stored within communication 78 by a processing entity such as an NFV-O, an NFV-O module, a VNF instance, etc., for its own use in the future are encrypted using the public key of the processing entity. Therefore, only the processing entity storing the memory item in the communication 78 can thereafter encrypt it (using its private key) and use it.

A hierarchical system of encryption-decryption key pairs, for example, corresponding to the NFV-O hierarchy as described above with reference to FIG. 6, can be used to exchange information securely within a particular segment of the network. For example, within a sub-hierarchy of the NFV-O hierarchy, between VNF instances of a particular group, chain or service, etc.

Encryption can be used for several types of needs such as: own use, communicated data, and shared data. Own use means that a modules (and/or VNFs and/or VNF instances) stores data within the communication 78 of its own use in the future. Communicated data means that a first modules dens the data to a particular second module. In this case, the first module may encrypt the data, for example, using the public key of the second (receiving) module. Shared data means that a particular piece of data (record) may be used (written, and/or read, and/or modified) by three or more modules in a changing, and possible unpredictable, order (sequence). In this case, the module that has to encrypt the data cannot know at that time which module may have to access the data next.

For example, if several modules (and/or VNFs and/or VNF instances) have to use or share the same data stored within the communication 78, such as within procedure history 102, procedure memory 103, data/content 105, etc., then these modules should use the same encryption mechanism and keys. This means that encryption keys should be generated and properly communicated between modules sharing particular data. Public key system is an appropriate mechanism, but other encryption mechanisms are also possible. Central key management may be operated by an appropriate NFV-O module. An appropriate NFV-O module in the NFV-O hierarchy may generate and/or distribute the encryption keys (or key pair), and or control their use.

Alternatively, shared data can be encrypted and decrypted solely by the appropriate NFV-O component. For example, when encrypting shared data, the writing (e.g., sending) module (and/or VNFs and/or VNF instances) may encrypt the shared data using the public key of the appropriate NFV-O component. The reading (e.g., receiving) module may then send the encrypted data to the appropriate NFV-O component for transcoding. The appropriate NFV-O component then decrypts the data (using its own private key), encrypts the data again using the public key of the reading module, and send it back to the reading module.

Typically, this appropriate NFV-O module is the lowest common denominator for the particular plurality of modules (and/or VNFs and/or VNF instances) sharing the data. Namely, the NFV-O module or component of the lowest level that controls all the modules, and/or VNFs and/or VNF instances sharing the data.

In some cases the need for data sharing is a part of the design of a particular procedure and can be planned in advance. In other cases the need for sharing data is external to the procedure itself. For example, in the case of VNF migration. In VNF migration a first VNF instance is replaced by a second VNF instance, typically in a different hardware unit. Such VNF migration may result from activities such as preventive maintenance, fault recovery, security management, etc. The VNF migration may include migrating a single VNF instance, a group (chain) of VNF instances, or a service.

In the case of VNF migration the second VNF instance has to use data stored within the communication 78 by the first VNF instance, and which has not been intended for sharing. If this data is encrypted, the appropriate key should be provided to the second VNF instance. This may be executed by an appropriate NFV-O module or component such as the lowest denominator NFV-O module or component.

Another situation is when an NFV-O process is escalated, or delegated, within the NFV-O hierarchy. For example, in a case such as VNF deployment optimization, service (chain) deployment optimization, recovery from a security event, fault recovery, preventive maintenance, etc. In such case data may have to be used by an entity, or module (such as a VNF or a VNF instance, or an NFV-O component, etc.) that has not been intended to access the data. Encryption keys should therefore be generated, managed and communicated within the NFV-O hierarchy in anticipation of such cases.

In this respect, authentication data, such as elements 96, 99, 101, and 109 may each include an identification of a respective NFV-O component that initiated, or authorized, the particular respective data element which the particular authentication data authenticates. This NFV-O component may also be responsible for managing and/or controlling the encryption mechanism (e.g., encryption keys) used for securing the use of the respective data element. This enables the receiving entity (such as module, VNF or VNF instance, or another NFV-O component, etc.) to verify that the particular data element is secured and authentic, and to decrypt it.

Reference is now made to FIG. 10, which is a simplified illustration of a syntax of a communication (e.g. communication 78 of FIG. 9), according to one embodiment. As an option, FIG. 10 may be viewed in the context of the details of the previous Figures. Of course, however, FIG. 10 may be viewed in the context of any desired environment. Further, the aforementioned definitions may equally apply to the description below.

A seen in FIG. 10, the syntax of communication is similar to HTML, XML, JSON and other data exchange formats. A data element such as those described above with reference to FIG. 9 are presented as text identifying the data element (e.g. "SENDER-ID", "INSTRUCTION-TYPE", "MODIFIER-VALUE", etc.) followed by "###" denoting a value corresponding to the preceding data identifier. As seen in FIG. 10, a data element (typically a pair of data identifier and value) is typically parenthesized by "{ }" and a group of data elements (such as a modifier) is typically parenthesized by "[ ]", enabling nesting.

As described herein, the protocol management system (e.g. protocol management system 75) and VNF communication protocol (e.g. VNF communication protocol 76) provide a system and a method for communicating information in an NFV-based communication network, the method including: sending a communication from a first entity of the NFV-based communication network; and receiving the communication by a second entity of the network. The communication includes an identification of the sender, and an identification of the receiver, an identification of a function associated with the NFV-based communication network; and an authorization associating at least one of the sender and the receiver with the function. The term function here refers to any functionality of the network itself, functionality of any module of managing the network, such as an NFV-O module, or functionality of an NFV module.

As described herein, the protocol management system process, and VNF communication protocol additionally includes, a record indicating an information type, where the information type may be any of: identification of a sender, identification of a receiver, identification of a function, authorization, etc. Such information type is typically followed, or accompanied, by a value, corresponding to the information type, typically provided by alphanumeric characters.

The protocol management system process, and VNF communication protocol may include, an indication that a following value is an identifier of a virtual network function (NFV) or instance, followed by a value identifying the VNF module or instance.

A communication processed by the protocol management system, or according to the VNF communication protocol, may also include an indication that a following value is a particular parameter of the virtual network function followed by a value of the parameter, or an indication that a following value is a particular parameter of the virtual network function and a request for a current value of the parameter.

Such communication may also, or alternatively, include an instruction to initiate a function associated with a VNF, an instruction to initiate an instance of a VNF, a request for a resource associated with a VNF, and/or a procedure associated with a plurality of VNFs.

Such communication may also, or alternatively, include an identification of a vendor of a virtual network function, and/or an identification of a release of the virtual network function.

Such communication may further include an indication that a following value is an identifier of a sender of the communication, typically followed by a value identifying the sender, and/or an indication that a following value is an identifier of a receiver of the communication, followed by a value identifying the receiver.

Figure 15:
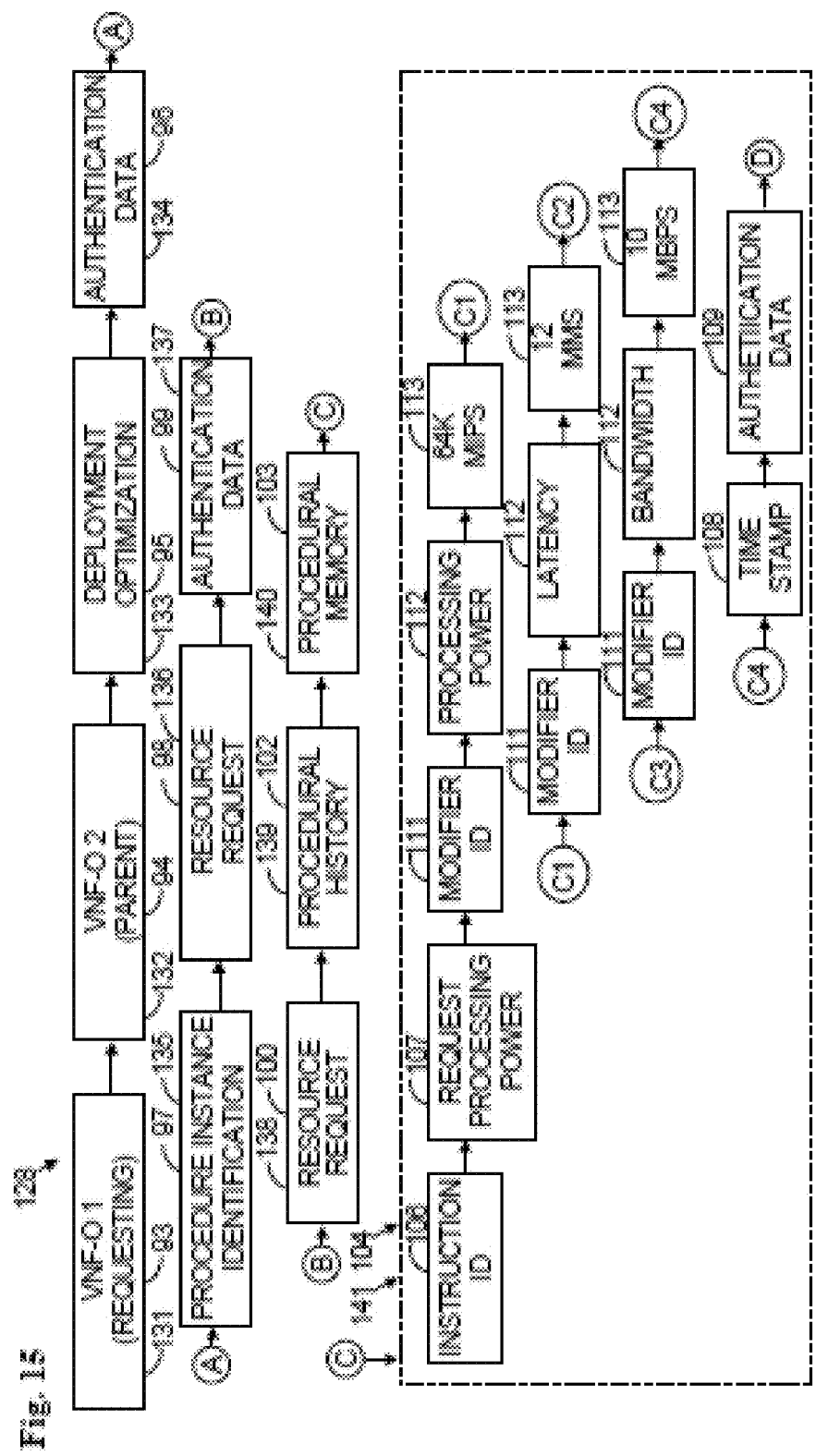
FIG. 15 is a simplified block diagram of command requesting a resource from a parent NFV-O, in accordance with one embodiment.

As described herein and particularly with reference to FIG. 7, FIG. 9, and FIG. 15, the VNF communication protocol 76 typically includes the following aspects: security services, typically including means such as encryption, decryption, authentication and authorization; conversion services, typically including converting between naming conventions, format conventions, units, values, etc.; memory services, typically including storing data elements within entities of the VNF communication protocol 76, such as within one or more communications, such as within particular elements of a communication, such as procedure history, and procedure memory; and process flow management services, typically provided by embedding with the VNF communication protocol 76, and particularly within procedure data flow of the communication, instructions affecting the flow of particular data between entities of the NFV-based networks.

There is also the ability for flexible structure and content. For example, a communication such as communication 78 of FIG. 8, etc., may include any number of protocol elements (such as the elements of communication 78 of FIG. 9, etc.), any number of types of protocol elements, any number of protocol elements of the same type, and any combination of types of protocol elements. A communication may contain protocol elements in any order. New types of elements can be added to VNF communication protocol.

Further, there is multi-party communication in which a communication may travel between two or more entities of the NFV-based network (such as VNF-Os, VNF-O modules, VNF instances, CMSs, etc.). Any party of a plurality of entities of the NFV-based network may add protocol elements to a communication it received and forward the communication to another entity of the network. Different parts of a communication may be encrypted or otherwise protected in a way that only particular entities of the NFV-based network to which the particular part of the communication pertains can access the contents of the particular part.

For example, a communication may be used to define a service provided by a particular plurality (e.g., a chain) of VNF instances. The service is typically created by including a procedure (i.e., service) flow in one or more elements of procedure data flow 100 of FIG. 9, and one or more instructions 104 of FIG. 9. The procedure flow includes instruction for an entity of the NFV-based network receiving the communication, such instructions may be: which instruction (of the instructions listed in the communication) to execute; conditions (for example as listed in one or more associated modifiers 110 of FIG. 9) upon which any of the instructions to execute (including timing conditions); order in which instructions are to be executed; to which other entity of the NFV-based network the communication should be forwarded; conditions for selecting one or more entities of the NFV-based network to which communication should be forwarded; and data to upload to the communication.

For example, a first entity of the NFV-based network may include in the communication an instruction where the instruction type (e.g. instruction type 107 of FIG. 9) is PROCESSING CODE, and a modifier type indicates for example, C++ CODE, and the modifier value contains the code (i.e. a C++ program). A second entity of the NFV-based network, as defined in the procedure data flow element of the communication, executes the particular instruction (e.g. instruction 104 of FIG. 9), loading the code in modifier value (e.g. the modifier value 113 of FIG. 9), using the code to determine where to forward communication (as defined in the procedure data flow 100 element of FIG. 9, etc.).

It is appreciated that the first and second entities of the NFV-based network may not be contiguous or successive within the chain of entities of the NFV-based network as defined in the procedure data flow element.

It is also appreciated that any type of adequate computer language can be used, such as C, C++, C#, Java, JavaScript, Perl, Python, etc. The code may be provided in an interpreter-ready computer language. Alternatively, run-time compilation may be used (also known as just-in-time compilation, or dynamic compilation).

It is further appreciated that the instruction may include more than one modifier including different codes (programs) or the same code in different computer languages. It is appreciated that protocol conversion module such as protocol conversion module 82 of FIG. 7 can be used to automatically convert a code from one computer language to another. For example, if the processing facility of the entity of the NFV-based network receiving the code is unable to process the code as received the protocol conversion module may replace the received code with a version of the code (e.g. another language) that is adequate to the processing facility of the receiving entity of the NFV-based network.

Therefore, according to one embodiment, a procedure or a service may be provided, or performed, or executed, by a plurality of VNF instances such as a service of FIG. 5, etc. Such service may be defined and/or initiated using a command such as command 78 of FIG. 9. A command 78 may include an identification of the type of service 57 (e.g. element 98 of FIG. 9), an ID of the particular instance of the service (e.g. element 97 of FIG. 9), the data flow of the service (e.g. element 100 of FIG. 9), and a plurality of instructions (e.g. a plurality of elements 104 of FIG. 9).

Typically, the process flow indicates which VNF instance executes which instruction, typically including conditions for executing the particular instruction. The process flow and/or instructions indicate to the VNF instances where to send the command for further processing. A command (i.e. the command 78 of FIG. 9) is typically generated by an NFV-O, which sends a command defining and initiating a particular service to one or more VNF instances, which forwards the command to other VNF instances as indicated in the process flow. The command therefore bounces back and forth between VNF instances of a service as long as the service is provided and/or on-going.

It is appreciated that a command can be initiated by an NFV-O core component anywhere in the NFV-O hierarchy of FIG. 6, and travel down through the hierarchy until a leaf component sends the command to one or more VNF instances. The authentication data records (e.g. elements 96, 99, 101, and 109 of FIG. 9) keep track of the authorization chain.

It is appreciated that a command may include a plurality of data records for process ID, process type and process flow, thus initiating a complex service.

According to one embodiment, every entity receiving the command verifies the authenticity of the command as well as the authenticity of each of its parts that is relevant to the particular receiving entity. Authenticating a command or a part (component, element) of the command includes verifying that the command and/or its part are originated by the sending or originating entity and that the sending or originating entity is authorized to issue the particular command and/or its part.

Typically, the protocol management module of the receiving entity authenticates the received command and its relevant parts with an entity supervising the sending entity, such as shown and described with reference to FIG. 7. Typically, the supervising entity is an NFV-O.

For example, if the command is received by a VNF instance from another VNF instance the receiving VNF instance verifies the command (and/or its part) with their supervising leaf component.

For example, if the command is received by a VNF instance from a leaf component the receiving VNF instance verifies the command (and/or its part) with the core component supervising leaf component.

For example, if the command is received by a core component (or a leaf component) form another core component (or a leaf component) the receiving NFV-O component may verify the command (and/or its part) with the core component directly supervising the sender NFV-O component.

Typically, the protocol management module of the receiving entity authenticates the received command and its relevant parts with an entity supervising both the sending entity and the receiving entity. If a service spans two or more NFV-O components the security check and authentication may reach higher into the NFV-O hierarchy, typically following the authorization chain as logged in the authorization data elements (e.g. elements 96, 99, 101, and 109 of FIG. 9).

A VNF instance executing a procedure initiated by a command typically stores the memory parameters that are pertinent to the particular procedure in the command, typically in the procedure memory. When the command returns to the VNF instance for further processing, for example, with additional data or content, the VNF instance reads the pertinent parameters from the command (e.g. from procedure memory 103 of FIG. 9). For example, if the VNF instance is migrated, or if the process is diverted to a backup VNF instance, the command provides the new VNF instance all the information required to continue the processing of the particular procedure.

Figure 11:
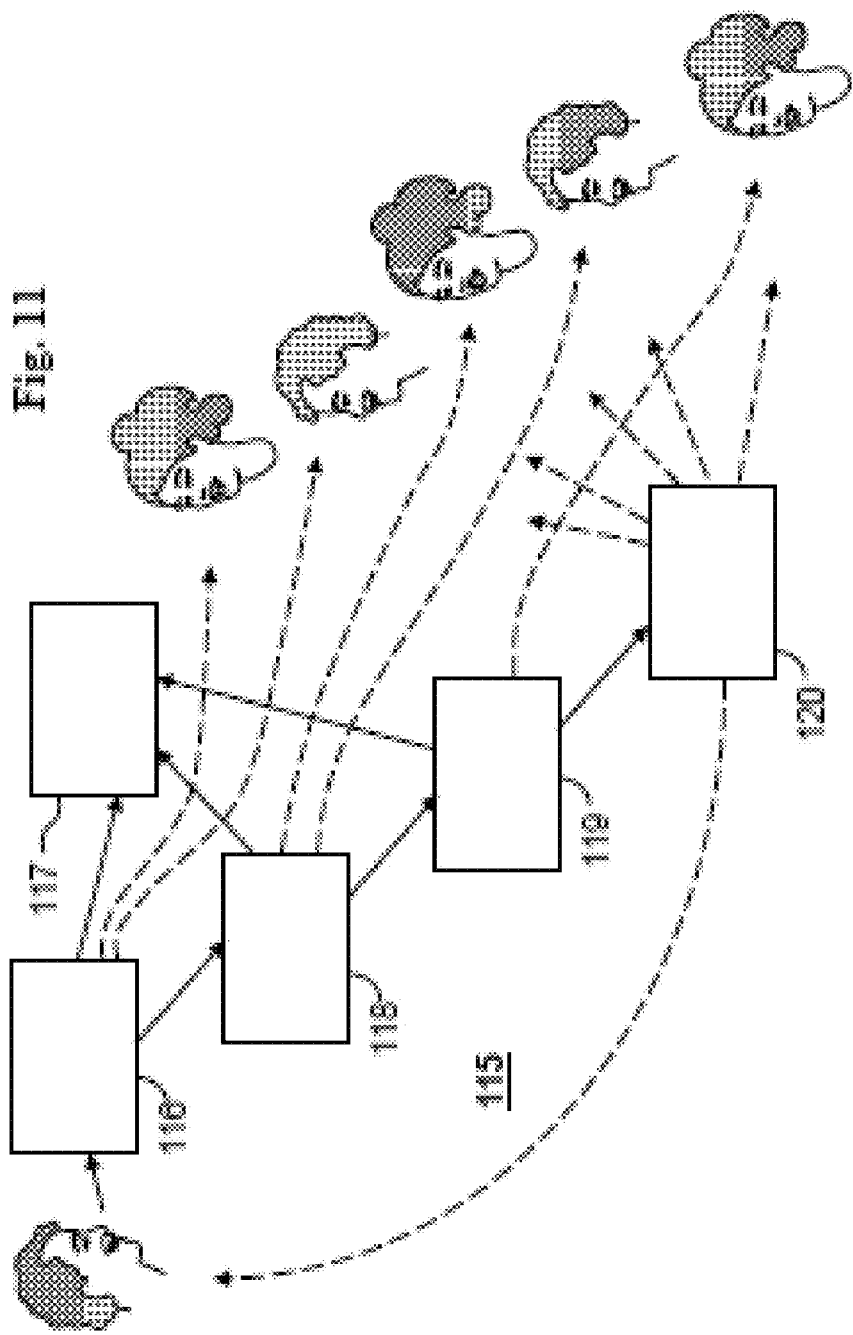
FIG. 11 is a simplified flow diagram of a telephony process, in accordance with one embodiment.

Reference is now made to FIG. 11, which is a simplified flow diagram of a telephony process 115, according to one embodiment. As an option, FIG. 11 may be viewed in the context of the details of the previous Figures. Of course, however, FIG. 11 may be viewed in the context of any desired environment. Further, the aforementioned definitions may equally apply to the description below.

It is appreciated that telephony process 115 is provided here solely as an example of some aspects of one possible implementation of a process performed by modules of an NFV-based network (e.g. as described in the context of the previous figures), and described in the scope of procedure component 89 of communication 78 of FIG. 8. In this example of a process flow, a conference communication service operates as described in the following steps A-F.

A) A user calls a particular telephone number on a voice over IP (VoIP) system operating, for example, as a first VNF instance, designated by numeral 116.

B) Upon receiving the call the first VNF instance connects to a first list of addressees opening a video conference call. Additionally, the first VNF instance connects to a recording system implemented as a second VNF instance, designated by numeral 117. If any of the addresses are unavailable over VoIP, the first VNF instance forwards these addressees as a second list of addressees, to a mobile switch, implemented as a third VNF instance, designated by numeral 118.

C) The third VNF instance dials to the mobile telephones of the second list of addresses. If any of the mobile numbers answers the call, the third VNF instance connects to the first VNF instance as a VoIP member. If at least one the mobile numbers did not answer the call, the third VNF instance forwards to a text messaging system, implemented as a fourth VNF instance designated by numeral 119, a third list of addressees indicating these addressees.

D) The text messaging system sends a text message to the mobile telephones of the addresses not answering the mobile call. The third VNF instance (mobile switch) also sends the third list to the second VNF instance (the recording system).

E) Upon the conference call being concluded, the second VNF instance informs the fourth VNF instance (text messaging system) that sends the third list members another text message indicating that the call is over and where to find the recording over the Internet. The second VNF instance further sends to an email messaging system, implemented as a fifth VNF instance, designated by numeral 120, an indication when a member of the third list accessed the recording message.

F) The fifth VNF instance then sends an email message to all the users with the call logging information.

Reference is now made to FIG. 12, which is a simplified illustration of a process-flow part 121 for telephony process 115 of FIG. 11, according to one embodiment. As an option, FIG. 12 may be viewed in the context of the details of the previous Figures. Of course, however, FIG. 12 may be viewed in the context of any desired environment. Further, the aforementioned definitions may equally apply to the description below.

Process-flow part 121 is a component of a communication initiating the flow of telephony process 115 as described above with reference to FIG. 11. Process-flow part 121 is similar to process flow 100 of communication 78 of FIG. 9.

As shown in FIG. 12, process-flow part 121 lists the entities participating in executing a telephony process (e.g. the telephony process 115 as described above with reference to FIG. 11). The entities are typically VNF instances allocated to the current telephony process. Process-flow part 121, when launched, is a specific instance of a process-flow type for implementing the telephony process. Process-flow part 121 therefore designates particular VNF instances that are allocated for the particular instantiation of the telephony process.

Process-flow part 121 therefore optionally includes an NFV-O, typically a leaf NFV-O, which should designate the particular VNF instances, and if necessary, install VNFs, and initiate VNF instances. If necessary, the NFV-O may also de-allocate VNF instances, deactivate VNF instances, and remove VNFs.

The instructions following each of the designated entities details the actions to be performed by the relevant entity including communicating with any of the other entities.

Reference is now made to FIG. 13, which is a simplified illustration of an instructions part 122 for the telephony process 115 of FIG. 11, according to one embodiment. As an option, FIG. 13 may be viewed in the context of the details of the previous Figures. Of course, however, FIG. 13 may be viewed in the context of any desired environment. Further, the aforementioned definitions may equally apply to the description below.

Instruction part 122 is a component of a communication initiating the flow of telephony process 115 as described above with reference to FIG. 11. Process-flow part 121 of FIG. 12 is of instructions 104 as described above with reference to communication 78 of FIG. 9.

As seen in FIG. 13, one of the instructions listed in instruction part 122 and designated "INSTRUCTION-ID: EC001" is directed to a NFV-O. The NFV-O is instructed to initiate a process. The details of the process initiation are provided in the modifiers part of the instruction. Being an example, this instruction lists only some of the modifiers. For example, one modifier instructs the NFV-O to allocate a mobile switch.

Aside for selecting the appropriate switch and designating it in the process-flow part, the NFV-O also provides an authorization code for the particular mobile switch and process. The authorization code will then be used by the protocol management modules to validate the authenticity of instruction bound to the mobile switch or originating from the mobile switch.

Another modifier of instruction EC001 instructs the NFV-O to initiate a VNF instance. The modifier refers the NFV-O to another instruction designated as EC007. Instruction EC007 instructs the NFV-O to activate a particular type of a recorder VNF. As with the mobile switch, the NFV-O adds the particular recorder VNF instance to the process-flow part and provides the relevant authorization codes for the protocol management modules.

Instruction part 122 then lists instructions directed to other components of the service, such as the VNF instances described above.

Figure 14B:
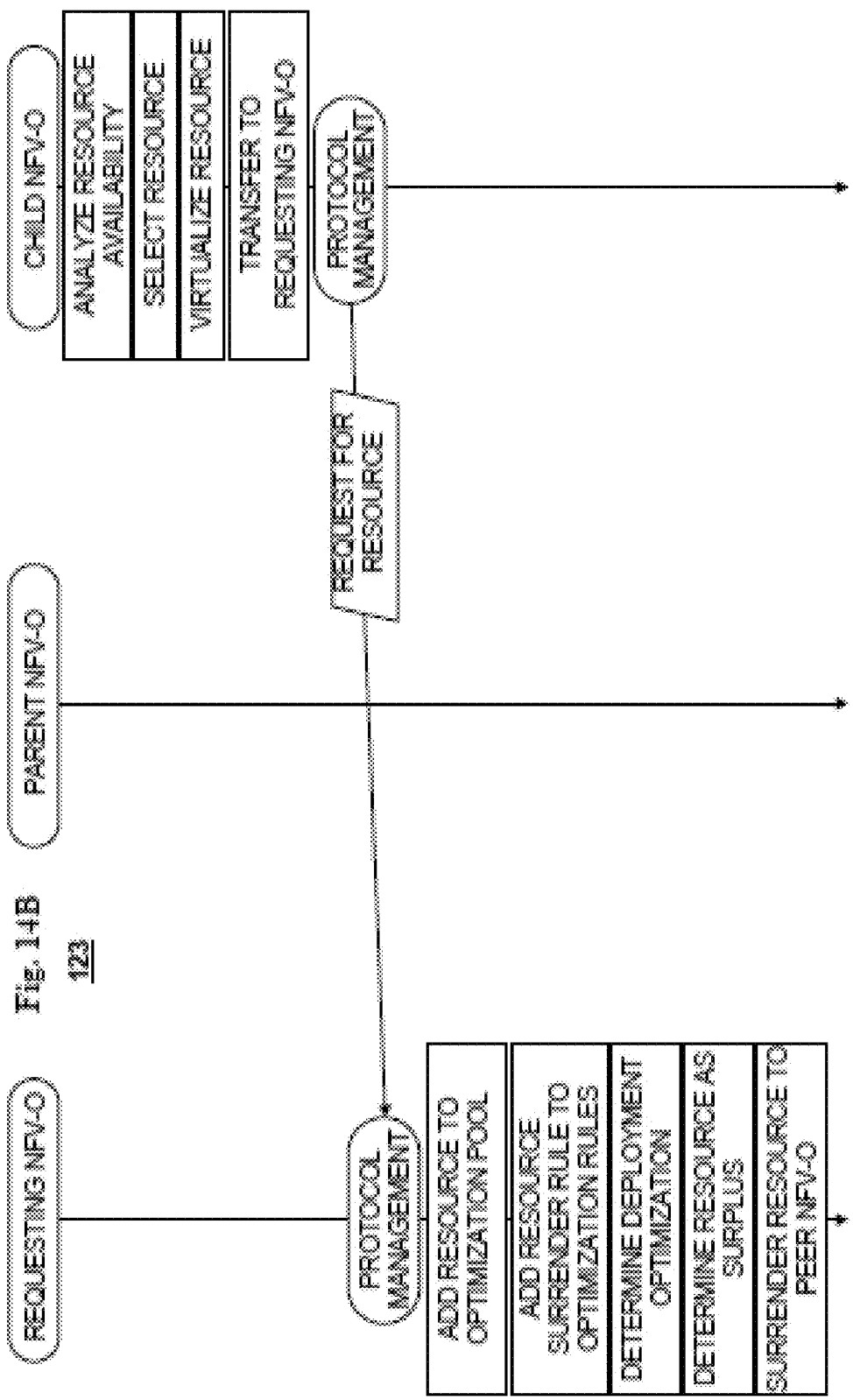

Reference is now made to FIGS. 14A, FIG. 14B, and FIG. 14C, which, taken together, are a simplified illustration of a control flow 123 between three NFV-O components, according to one embodiment. As an option, FIGS. 14A-C may be viewed in the context of the details of the previous Figures. Of course, however, FIGS. 14A-C may be viewed in the context of any desired environment. Further, the aforementioned definitions may equally apply to the description below.

Control flow 123 is an example of three NFV-Os using a VNF communication protocol to manage and/or redistribute resources of an NFV-based network. Particularly, a first child NFV-O requests additional resources from its parent NFV-O, which requests a second child NFV-O to provide the required resources to the first child NFV-O. The communication between the NFV-Os uses VNF communication protocol 76 as described with regard to communication 78 (in FIG. 8 and the associated discussion). It is appreciated that the protocol management modules of the three NFV-Os are involved in the management and/or redistribution of the resources of the NFV-based network, and that other modules, such as a deployment optimization module, a service fulfillment module, an assurance and service management module, and policy management module, may be involved as well.

According to the example of FIGS. 14A-C, control flow 123 typically starts in step 124 by a first NFV-O (the requesting NFV-O, designated by numeral 125) determining that a particular change of load affects the availability of a particular resource, and that consequently the resource is insufficient, or about to become insufficient, and therefore deployment optimization is required.

It is appreciated that such change of load is typically associated with a particular service (see FIG. 5) provided, at least partially, within the part of the NFV-based network for which the first (requesting) NFV-O manages. More particularly, the change of load is typically associated with a particular VNF instance managed by the first (requesting) NFV-O.

In step 126, the first NFV-O determines that its internal resources are insufficient to provide for the change of load. In step 127, the first NFV-O sends a command 128 to its parent NFV-O (designated by numeral 129) requesting additional resources.

It is appreciated that steps 124, 126 and 127 are typically performed by a deployment optimization module (e.g. as in FIG. 4, etc.), additionally using a protocol management module to perform step 130, to create and format command 128 according to requirements of the VNF communication protocol, typically adding security features such as encryption, authentication data (such as elements 96, 99, and 109 of FIG. 9), authorization data, etc.

Reference is now made to FIG. 15, which is a simplified block diagram of command 128 of FIG. 14A requesting a resource from a parent NFV-O, according to one embodiment. As an option, FIG. 15 may be viewed in the context of the details of the previous Figures. Of course, however, FIG. 15 may be viewed in the context of any desired environment. Further, the aforementioned definitions may equally apply to the description below.

As described above with reference to FIG. 14A, command 128 is typically sent by a child or a leaf NFV-O (such as core components, or leaf component of FIG. 6) to its parent NFV-O (typically a core component) requesting one or more network resources such as processing power, memory, storage, communication bandwidth, (probably also specifying latency and/or jitter), electric power, cooling etc. Command 128 is a typical version of communication (command) 78 shown and described above with reference to FIG. 9. Command 128 is typically processed by protocol management system 75 as shown and described above with reference to FIG. 7, where sender 77 of FIG. 7 is the requesting NFV-O and receiver 79 is the parent NFV-O.

As seen in FIG. 15, command 128 includes elements of a communication such as: sending instance identification 131 (element 93 of communication 78 of FIG. 9), including a unique identification of the requesting NFV-O; receiving instance identification 132 (element 94 of communication 78 of FIG. 9), including a unique identification of the parent NFV-O; sending module identification 133 (element 95 of communication 78 of FIG. 9), including a unique identification of the module sending the command 128, which in this case is typically deployment optimization module 33; authentication data 134 (element 96 of communication 78 of FIG. 9), including authentication codes for the requesting NFV-O and the parent NFV-O; procedure instance identification 135 (element 97 of communication 78 of FIG. 9), including a unique identification of the current deployment optimization procedure; procedure type identification 136 (element 98 of communication 78 of FIG. 9), including a unique identification of the type of the procedure to which communication 128 pertains, which, in the current case is resource redeployment; and procedure authentication data 137 (element 99 of communication 78 of FIG. 9), including authentication and/or authorization codes for the procedure designated by procedure instance identification 97 and procedure type identification 98.

In the current example, procedure type identification 136 designates a request for resource redeployment (and the procedure instance identification 135 designates a particular instance of a request for resource redeployment). Resource redeployment is an example of a procedure in which an NFV-O requests additional resources from another NFV-O, typically a parent NFV-O.

For example, NFV-O 125 of FIG. 14A (the requesting NFV-O) may be managing a particular segment of NFV-based network, and one or more VNF instances, or services, deployed in that particular segment of NFV-based network.

In the present example, one or more of these VNF instances or services is associated with a change of load triggering a need for deployment optimization. In the present example, the deployment optimization failed due to lack of resources, such as shown and described with reference to steps 124, 126 and 127 of FIG. 14A. Therefore, NFV-O 125 has sent command 128 to its parent NFV-O 129 (of FIG. 14A) requesting additional resources, namely resource redeployment. The VNF communication protocol enables the NFV-O 125 to provide authorization data to the parent NFV-O 129, proving that NFV-O 125 is authorized to make the particular request for resource redeployment.

It is appreciated that deployment optimization may be initiated for one or more reasons, or conditions, such as: a change in the demand for one or more resources; a change in a load on one or more resources; a change in one or more types of loads, or load parameters, such as latency, on one or more resources; a change in the combination of loads, or load parameters, on one or more resources, a fault, initiating a fault recovery process; and a scheduled process of preventive maintenance.

It is also appreciated that deployment optimization may be initiated because such load conditioned has passed a predefined threshold, or is expected to pass a predefined threshold. Such change of load may require deployment optimization to lower the load condition below the threshold, or enable the shut-down of a particular resource, for example to save cost, energy, pollution, etc., thus increasing the load condition above the threshold. The term "load" or "load change" refers to any of the above reasons, conditions and deployment procedures.

Authorization data may cover one or more authorization aspects associated with the entity sending the command (in the present example, NFV-O 125 sending command 128). In the present example, such authorization aspects may include a proof (e.g. authorization code) that NFV-O 125 is authorized to manage the particular segment of NFV-based network for which the particular procedure is issued. Namely, the request for resource redeployment as defined by procedure type identification 98 and procedure instance identification 97 of FIG. 9.

Additionally, in the present example, such authorization aspects may include: a proof (e.g. authorization code) that NFV-O 125 is authorized to manage the particular VNF instances or services for which the particular procedure is issued (as defined by procedure type identification 98 and procedure instance identification 97 of FIG. 9); or a proof (e.g. authorization code) that NFV-O 125 is authorized to issue the particular command (as defined by procedure type identification 98 and procedure instance identification 97 of FIG. 9) for particular segment of NFV-based network. VNF instances, or services.

Each such authorization code can be traced to the authorizing party, typically a parent NFV-O.

According to one embodiment, all these authorization codes are provided by procedure authentication data 137. According to an alternative embodiment, command 128 includes a plurality of procedure authentication sets, where each set includes a procedure instance identification 97, a procedure type identification 98, and an authentication data 99 for these two procedure instance identification 97 and procedure type identification 98. Each procedure authentication set authenticates a particular authentication aspect. For example, a first set authenticates the authorization to manage the NFV-based network segment, a second set authenticates the authorization to manage the VNF instance or service, and a third set authenticates the authorization to issue the resource redeployment request.

It is appreciated that at some point before the current event resulting in command 128, NFV-O 125 received (for example from its then parent NFV-O) a command including an instruction to manage the particular segment of NFV-based network. Similarly, NFV-O 125 received a command including an instruction to manage one or more particular VNF instances 54, or a service 57. Each of these instructions is typically implemented as a particular procedure type identification 98, a particular procedure instance identification 97, and their respective authorization codes. These values are then used by NFV-O 125 in command 128 to authenticate its authorization to act on behalf of the segment of NFV-based network and particular VNF instances, or a service, to issue the request for resource redeployment.

Procedure instance identification 135 is typically used by all the entities involved in the current deployment optimization procedure. Optionally, the procedure instance identification 97 may include one or more suffixes identifying sub-processes. For example, when the current deployment optimization procedure involves two unrelated load changes, typically associated with unrelated services. In such case, the deployment optimization module may send to the parent NFV-O two independent requests for additional resources, each including procedure instance identification codes differed by their suffixes.

Identification data, such as sending instance ID 93, receiving instance ID 94, sending module ID 95, procedure instance identification 97, procedure type identification 98, etc., is typically a long random number created by the protocol management module. In one embodiment, each instance of the protocol management module may generate identification data upon request. In an alternative embodiment, an instance of protocol management module applies to the protocol management module of a supervising entity to issue the required identification data. A supervising entity may be a parent NFV-O, a security NFV-O, the root NFV-O, etc., or of a security management module of thereof.

Command 128 also includes the procedure data flow 138 (element 100 of communication 78 of FIG. 9), which includes a work-flow for the resource redeployment procedure. At this point the procedure data flow 100 may be empty, or include a single step. The complete flow is expected to be provided by the parent NFV-O.

Command 128 also includes the following data elements: procedure history 139 (element 102 of communication 78 of FIG. 9), which includes a track of the functions executed by the resource redeployment procedure so far, and thus, at this point, it is empty or includes the current step of requesting resource redeployment; and procedural memory 140 (element 103 of communication 78 of FIG. 9), which includes the memory of the resource redeployment procedure and at this point it is empty or includes the values of the following instruction 104.

Command 128 also includes instruction 141 (element 104 of communication 78 of FIG. 9), which includes the details of the request for additional resources (resource redeployment). Instruction 104 includes an instruction ID 106 and instruction type 107 followed by one or more groups of modifiers, a time stamp 108 and authentication data 109, as described above with reference to command 78 and FIG. 9. In the present example, instruction type 107 is a value denoting a request for additional processing power.

Command 128 also includes data/content 105 which may be empty or missing at this stage.

Regarding the modifiers, for example, the first modifier type 112 may be "required processing power amount in MIPS" (million instructions per second) followed by modifier value 113 including the number of MIPS required such as 64K. A second modifier type 112 may be "priority" followed by modifier value 113 indicating the required priority level. A third, or an alternative modifier type 112 may be "maximum latency" in microseconds followed by modifier value 113 indicating the required maximum latency. A following modifier type 112 may be "bandwidth", indicated in Mbps, followed by modifier value 113 indicating the number of Mbps.

For example, the modifiers "priority" or "latency" may indicate a requirement or a limit on the responsiveness of the processing facility. For example, considering that the requested processing power is a task in a multi-tasking environment, the requested processing power should be available at a particular priority level or within a particular time delay (latency).

It is appreciated that when additional processing power is requested, the requesting entity assumes that the additional processing power would be provided in a "distant" processing facility, thus requiring communication bandwidth to that distant processing facility. The bandwidth modifier indicates the maximum load on the communication link (such as a transmission line of FIG. 5).

It is appreciated that in this example of "resource conversion" available transmission capacity to a particular processing facility (e.g. a hardware unit of FIG. 5, etc.) is converted into required processing power available from that processing facility.

Returning to FIG. 14A, control flow 123 continues in step 142 where parent NFV-O 129 receives command 128, typically using its protocol management module. In step 142, the protocol management module performs some main tasks: decrypts command 128, validates the identification, authentication and authorization data elements (e.g. elements 93, 94, and 96, 97 and 99, and 109 of FIG. 15), and converts the parameters formats and/or values as necessary.

Regarding validating identification, authentication and authorization, the protocol management module validates that the sending instance (the requesting NFV-O) identified in element 93 is properly registered and authorized to manage the procedure instances identified by elements 97 and issue instruction 104.

Regarding format and value conversion, the protocol management module may need to convert some of the modifiers types 112 and values 113. For example, the requesting NFV-O may indicate a priority level assuming 256 optional levels while the receiving NFV-O may recognize only 16 levels. Alternatively, the requesting NFV-O may indicate a priority level while the receiving NFV-O expect a latency value.

Control flow 123 then continues to steps 143, 144, and 145 to analyze the current deployment of hardware units and VNF instances and their expected loads to determine the availability of the requested resource. In other words, the parent NFV-O 129 analyzes the current deployment for a child NFV-O that has a surplus processing power that meets the requirements as indicated by instruction 104 and its modifiers. Parent NFV-O 129 selects the appropriate child NFV-O 146 (step 144) and sends (step 145) a command 147 to child NFV-O 146 using its protocol management module (step 148). Command 147 instructs child NFV-O 146 to provide requested processing power to the requesting NFV-O 125.

Figure 16:
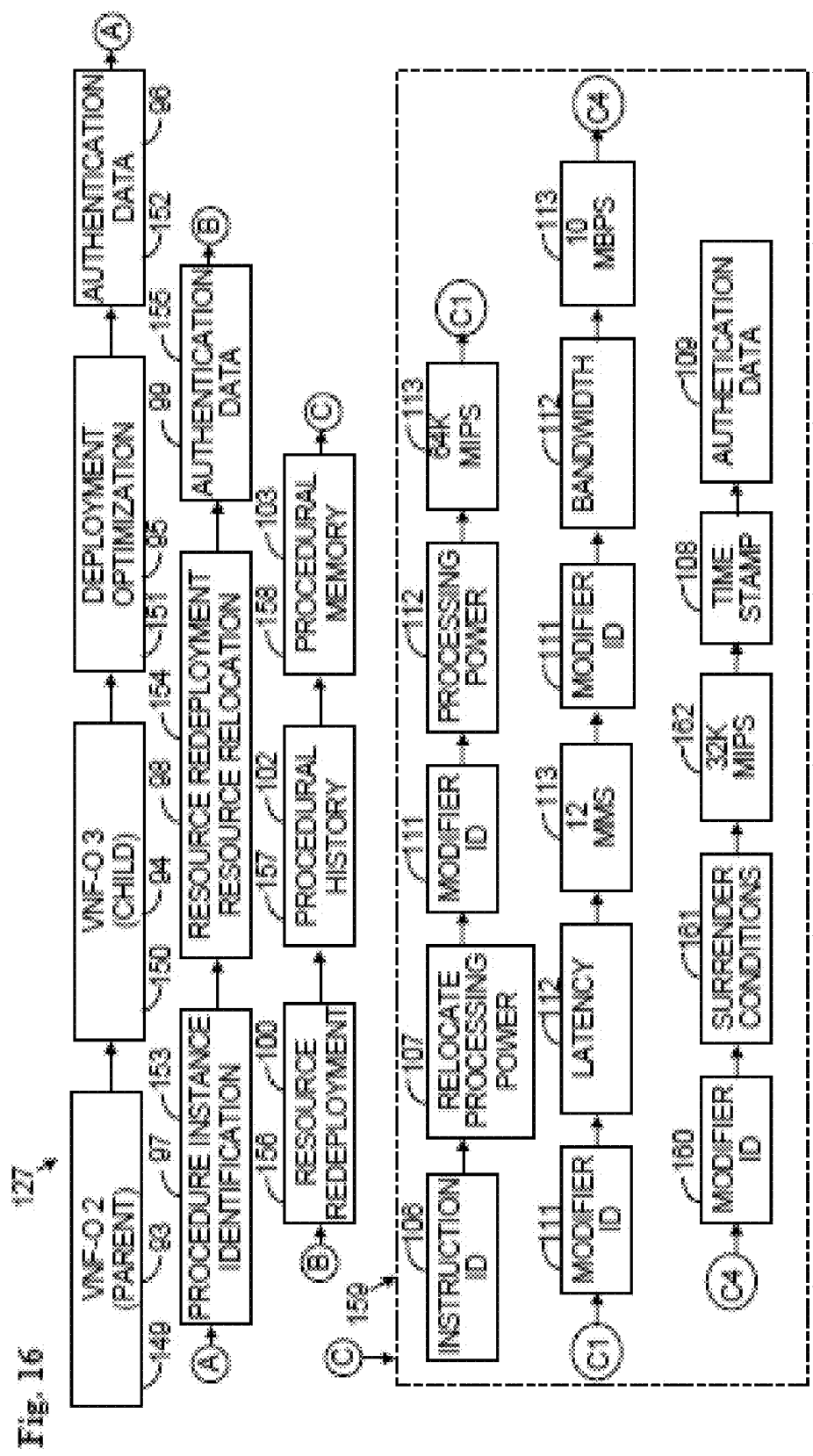
FIG. 16 is a simplified block diagram of command sent by a parent NFV-O to a child NFV-O, in the course of resource reallocation, in accordance with one embodiment.

Reference is now made to FIG. 16, which is a simplified block diagram of command 147 sent by parent NFV-O 129 to child NFV-O 146 in the context of FIG. 14A, according to one embodiment. As an option, FIG. 16 may be viewed in the context of the details of the previous Figures. Of course, however, FIG. 16 may be viewed in the context of any desired environment. Further, the aforementioned definitions may equally apply to the description below.

Similar to communication 78 of FIG. 9 and command 128 of FIG. 15, command 127 includes: sending instance identification 149 (element 93 of communication 78 of FIG. 9), including a unique identification of parent NFV-O 129 of FIG. 14A; receiving instance identification 150 (element 94 of communication 78 of FIG. 9), including a unique identification of child NFV-O 146 of FIG. 14A; sending module identification 151 (element 95 of communication 78 of FIG. 9), including a unique identification of the module sending the command 128, which in this case is typically deployment optimization module 33; authentication data 152 (element 96 of communication 78 of FIG. 9), including authentication codes for the requesting NFV-O and the parent NFV-O; procedure instance identification 153 (element 97 of communication 78 of FIG. 9), including a unique identification of the current deployment optimization procedure; procedure type identification 154 (element 98 of communication 78 of FIG. 9), which includes a unique identification of the type of the procedure to which communication 128 pertains, which, in the current case is resource redeployment; and procedure authentication data 155 (element 99 of communication 78 of FIG. 9), which includes authentication and/or authorization codes for the procedure designated by procedure instance identification 97 and procedure type identification 98. In the current example, procedure type identification 154 designates resource redeployment, which may be implemented in several scenarios.

In a first scenario, named herein "resource relocation", a parent NFV-O instructs a first child NFV-O to transfer the control over a particular hardware unit to a second child NFV-O that has requested the resource.

It is appreciated that the hardware unit being transferred may be a real (physical) hardware unit, or, alternatively, the first child NFV-O may create and transfer a virtual hardware unit. A virtual hardware unit is typically a part of a real (physical) hardware unit, which is created and managed by a virtual machine as a separate and independent virtual hardware unit.

Whether real or virtual, the transferred hardware unit becomes part of the NFV-based network segment managed by the second child NFV-O and is thus managed by the deployment optimization module (e.g. of FIG. 4, etc.) of the second child NFV-O. The second child NFV-O can now deploy VNFs and VNF instances within the transferred hardware unit according to deployment plans generated by its deployment optimization module. Consequently, the VNFs and VNF instances operating within the transferred hardware unit may change with time, typically, in real-time, according to, for example, changes in load, fault recovery, preventive maintenance, cost saving procedures (e.g. resource shut-down), etc.

It is appreciated that when a resource is relocated from a first NFV-O to a second NFV-O the relocation command includes an instruction, or condition, according to which the second NFV-O should surrender the relocated resource to the first NFV-O.

In a second scenario, named herein "resource provisioning", a parent NFV-O instructs the first child NFV-O to operate one or more VNF instances (a provisioned VNF instance) on behalf of the second child NFV-O that has requested the resource. The provisioning command typically includes an instruction, or a condition, according to which the second NFV-O (the requesting NFV-O) should request first child NFV-O (the provisioning NFV-O) to deactivate the provisioned VNF instance.

It is appreciated that for resource relocation the relocation is not physical, in the sense that the relocated resource is not physically moved. Instead, the relocation is virtual in the sense that the responsibility over the resource is transferred to the requesting NFV-O. In resource provisioning the responsibility over the resource remains with the providing NFV-O, which is also responsible for the VNF instances operating on behalf of the requesting NFV-O.

The conditions for surrendering the relocated resource to the providing NFV-O, and the conditions for deactivating the provisioned resource (or VNFs) provide a measure and a value, which, upon the measure meeting the value, the requesting NFV-O surrenders the relocated resource, requests deactivation of the provisioned resource. The measure is typically the same measure determining the need for the resource redeployment. The value is typically lower than the value determining the need for the resource redeployment, thus generating hysteresis.

The conditions for surrendering the relocated resource to the providing NFV-O, and the conditions for deactivating the provisioned resource (or VNFs) may also be provided by the requesting NFV-O. These conditions may be provided, for example, as a modifier (elements 111, 112 and 113 of instruction 104 of FIGS. 9 and 15), or as an additional instruction.

In the current example procedure type identification 154 designates resource redeployment of the type of resource relocation. Consequently, command 127 also includes procedure data flow 156 (element 100 of communication 78 of FIG. 9), including a work-flow for the resource redeployment procedure.

Reference is now made to FIGS. 17A-D, which, taken together, are a simplified flow chart of an example of procedure data flow 156 of FIG. 16, according to one embodiment. As an option, FIGS. 17A-D may be viewed in the context of the details of the previous Figures. Of course, however, FIGS. 17A-D may be viewed in the context of any desired environment. Further, the aforementioned definitions may equally apply to the description below.

FIG. 17A is an example of a procedure for resource relocation as executed by child NFV-O 146. As shown in FIG. 17A, NFV-O 146 adds additional load parameters, processes deployment optimization, identifies a resource for relocation, instructs resource virtualization, sends a resource relocation instruction to NFV-O 125, and updates NFV-O 129 of FIG. 14A.

FIG. 17B is an example of a procedure for cancelling resource relocation as executed by child NFV-O 146 after the requesting NFV-O 125 surrenders the relocated resource. As shown in FIG. 17B, NFV-O 146 determines whether the resource is surrendered, and if it is, instructs resource de-virtualization, processes deployment optimization, and updates NFV-O 129.

Figure 17C:
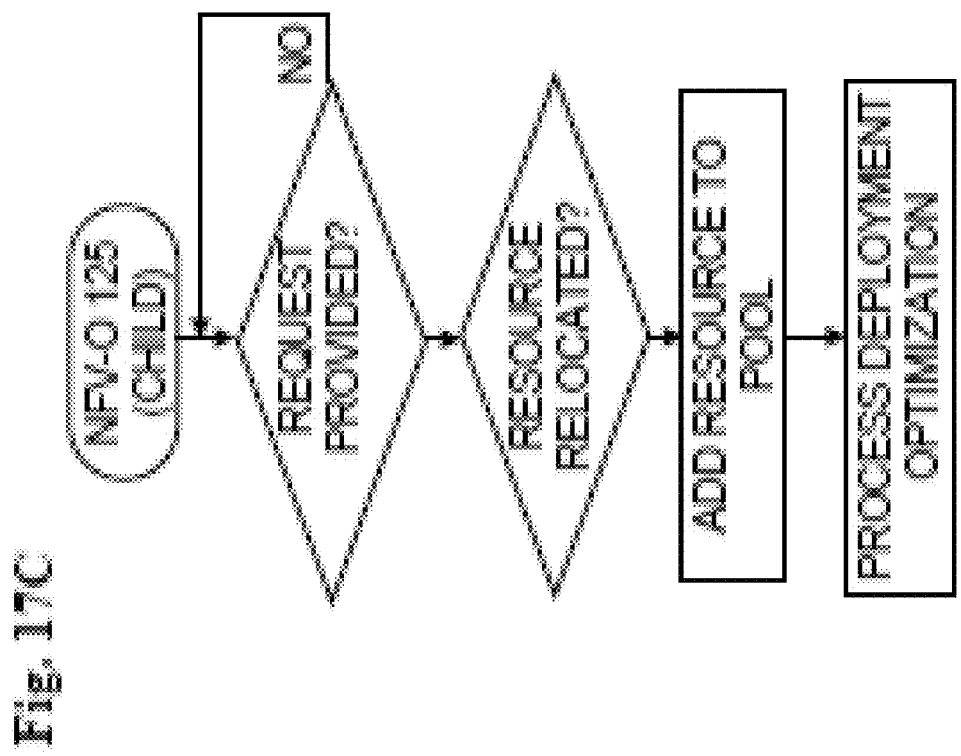

FIG. 17C is an example of a procedure for employing the relocated resource by child NFV-O 146. As shown in FIG. 17C, NFV-O 125 determines if a request has been provided and whether the resource is relocated, adds the resource to the pool, and processes deployment optimization.

FIG. 17D is an example of a procedure for surrendering the relocated resource by child NFV-O 146, when the surrendering conditions are met. As shown in FIG. 17D, NFV-O 125 measures the load, determines whether to surrender the resource, removes the resource from the pool, processes deployment optimization, sends a surrender instruction to the NFV-O 146, and updates NFV-O 129.

Returning to FIG. 16, command 127 additionally includes procedural history 157 and procedural memory 158. For example, these elements may include command 128 or parts thereof. Command 127 additionally includes instruction 159, which includes, for example, the parameters of instruction 141 with the addition of modifier ID 160, modifier type 161, and modifier value 162 indicating the conditions according to which the requesting NFV-O 125 should surrender the relocated resource.

Returning to FIG. 14A, control flow 123 continues to step 163, where child NFV-O 146 receives command 147 sent by parent NFV-O 129. Command 147 is received by the protocol management module of child NFV-O 146. In step 142, the protocol management module performs three main tasks: decrypts command 147, validates the identification, authentication and authorization data elements (e.g. elements 131, 132, 134, 135, 99, and 109—corresponding to elements 93, 94, 96, 97 and 99 of FIG. 9), and converts the parameters formats and/or values as necessary, so that the parameters are comprehensible by the receiver (child NFV-O 146).

Control flow 123 then proceeds as detailed in FIGS. 14B-C and FIGS. 17A-D.

Figure 18:
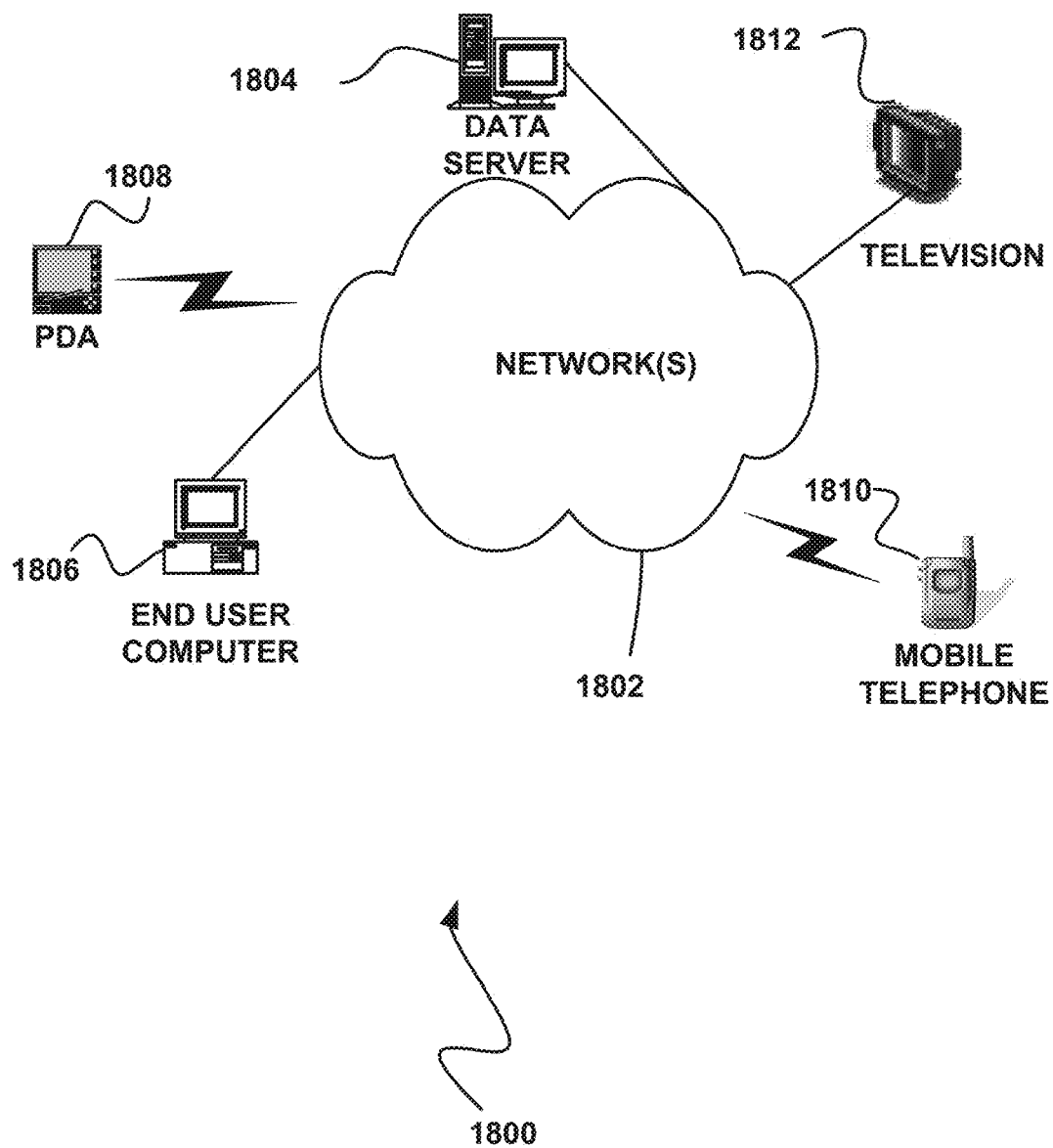
FIG. 18 illustrates a network architecture, in accordance with one possible embodiment.

FIG. 18 illustrates a network architecture 1800, in accordance with one possible embodiment. As shown, at least one network 1802 is provided. In the context of the present network architecture 1800, the network 1802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1802 may be provided.

Coupled to the network 1802 is a plurality of devices. For example, a server computer 1804 and an end user computer 1806 may be coupled to the network 1802 for communication purposes. Such end user computer 1806 may include a desktop computer, lap-top computer, and/or any other type of logic. Still yet, various other devices may be coupled to the network 1802 including a personal digital assistant (PDA) device 1808, a mobile phone device 1810, a television 1812, etc.

Figure 19:
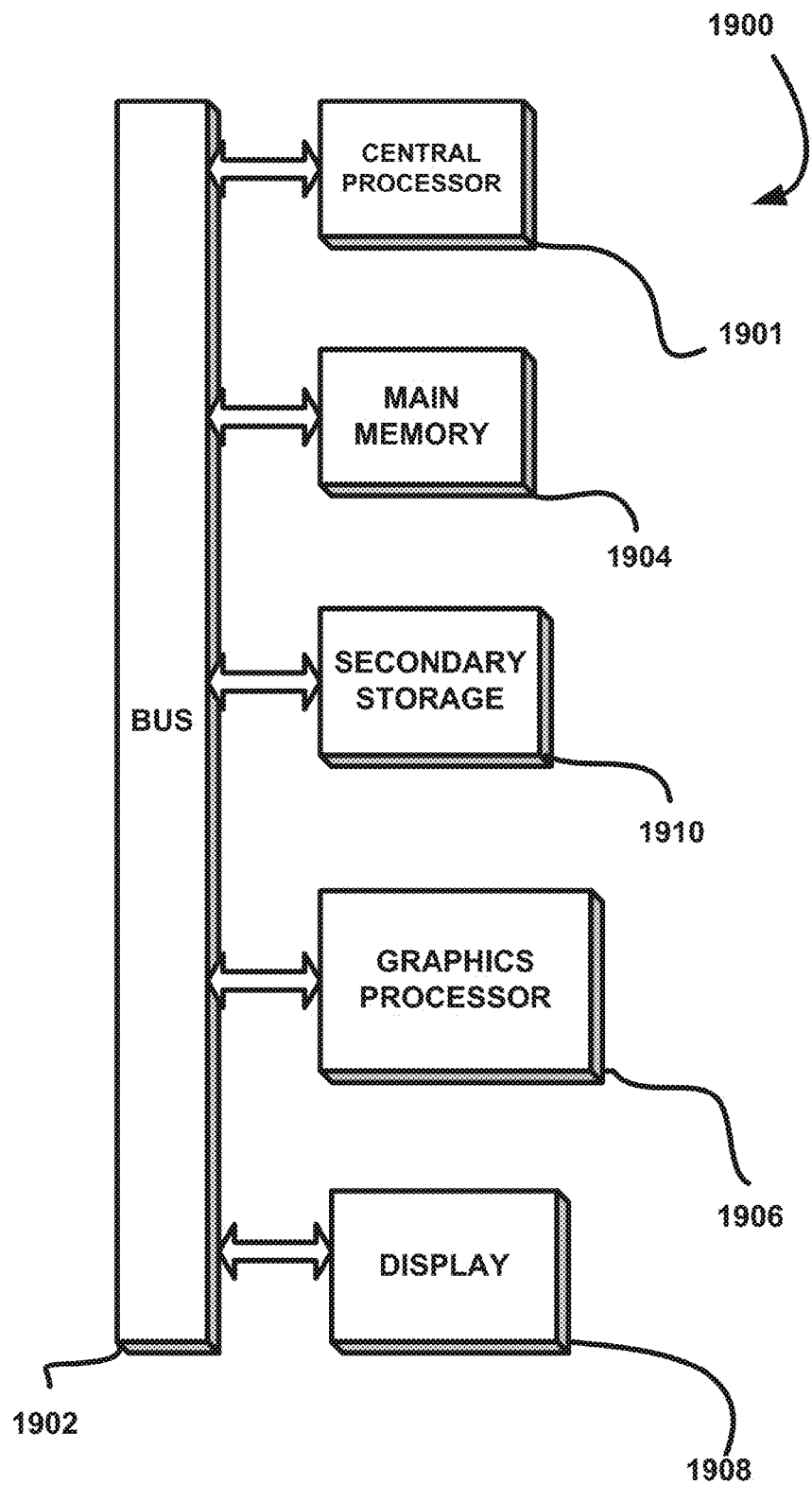
FIG. 19 illustrates an exemplary system, in accordance with one embodiment.

FIG. 19 illustrates an exemplary system 1900, in accordance with one embodiment. As an option, the system 1900 may be implemented in the context of any of the devices of the network architecture 1800 of FIG. 18. Of course, the system 1900 may be implemented in any desired environment.

As shown, a system 1900 is provided including at least one central processor 1901 which is connected to a communication bus 1902. The system 1900 also includes main memory 1904 [e.g. random access memory (RAM), etc.]. The system 1900 also includes a graphics processor 1906 and a display 1908.

The system 1900 may also include a secondary storage 1910. The secondary storage 1910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1904, the secondary storage 1910, and/or any other memory, for that matter. Such computer programs, when executed, enable the system 1900 to perform various functions (as set forth above, for example). Memory 1904, storage 1910 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for communicating information in a communication network using network function virtualization (NFV-based communication network), said method comprising:
    creating, by a computer system including a first entity of said NFV-based communication network, a communication in accordance with a predefined virtual network function (VNF) protocol, wherein said communication is generated in accordance with said VNF protocol to include:
        an identification of a sender of said communication, and an identification of a chain of receivers of said communication,
        authentication data that enables said sender to verify that only said chain of receivers can decrypt said communication,
        an identification of a procedure associated with said NFV-based communication network,
        an authorization of at least one of said sender and said chain of receivers to perform said procedure,
        a work-flow for the procedure that includes for each receiver in the chain of receivers:
            (a) one or more instructions to be executed by the receiver,
            (b) an indication of data to upload to the communication, and
            (c) an indication of a next receiver in the chain of receivers to which the communication is to be forwarded,
        a history for the procedure that tracks an execution status of the procedure;
    sending said communication through said computer system from said first entity of said NFV-based communication network, said first entity being said sender;
    receiving said communication by a second entity of said NFV-based communication network, said second entity being included within said computer system or within another computer system, and said second entity being a first receiver in the chain of receivers; and
    processing said communication, by said second entity through said computer system or through said other computer system including said second entity, based on said authorization.

2. A computer program product embodied on a non-transitory computer readable medium for communicating information in a communication network using network function virtualization (NFV-based communication network), said computer program product comprising:
    computer code for creating, by a computer system including a first entity of said NFV-based communication network, a communication in accordance with a predefined virtual network function (VNF) protocol, wherein said communication is generated in accordance with said VNF protocol to include:
        an identification of a sender of said communication, and an identification of a chain of receivers of said communication,
        authentication data that enables said sender to verify that only said chain of receivers can decrypt said communication,
        an identification of a procedure associated with said NFV-based communication network,
        an authorization of at least one of said sender and said chain of receivers to perform said procedure,
        a work-flow for the procedure that includes for each receiver in the chain of receivers:
            (a) one or more instructions to be executed by the receiver,
            (b) an indication of data to upload to the communication, and
            (c) an indication of a next receiver in the chain of receivers to which the communication is to be forwarded,
        a history for the procedure that tracks an execution status of the procedure;
    computer code for sending said communication through said computer system from said first entity of said NFV-based communication network, said first entity being said sender;
    computer code for receiving said communication by a second entity of said NFV-based communication network, said second entity being included within said computer system or within another computer system, and said second entity being a first receiver in the chain of receivers; and
    processing said communication, by said second entity through said computer system or through said other computer system including said second entity, based on said authorization.

3. A system for communicating information in a communication network using network function virtualization (NFV-based communication network), said system comprising:
    at least one computer system including a first entity of said NFV-based communication network and a second entity of said NFV-based communication network for:
        creating a communication in accordance with a predefined virtual network function (VNF) protocol, wherein said communication is generated in accordance with said VNF protocol to include:

an identification of a sender of said communication, and an identification of a chain of receivers of said communication, authentication data that enables said sender to verify that only said chain of receivers can decrypt said communication, an identification of a procedure associated with said NFV-based communication network, an authorization of at least one of said sender and said chain of receivers to perform said procedure, a work-flow for the procedure that includes for each receiver in the chain of receivers:
 (a) one or more instructions to be executed by the receiver,
 (b) an indication of data to upload to the communication, and
 (c) an indication of a next receiver in the chain of receivers to which the communication is to be forwarded, a history for the procedure that tracks an execution status of the procedure;

sending said communication through said at least one computer system from said first entity of said NFV-based communication network, said first entity being said sender;

receiving said communication by said second entity of said NFV-based communication network, said second entity being a first receiver in the chain of receivers; and processing said communication, by said second entity through said at least one computer system including said second entity, based on said authorization.

4. The method of claim 1, wherein the work-flow further includes:
 (d) conditions for executing the one or more instructions, and
 (e) an order of execution for the one or more instructions.

5. The method of claim 1, wherein each receiver in the chain of receivers verifies an authenticity of the communication, including verifying that the communication originated from the sender and that the sender is authorized to issue the command.

6. The method of claim 1, wherein the data is uploaded to the communication by the receiver such that the data is made accessible to a next receiver in the chain receivers for further processing the procedure.

* * * * *